US007990849B2

(12) United States Patent
McGee et al.

(10) Patent No.: US 7,990,849 B2
(45) Date of Patent: Aug. 2, 2011

(54) AUTOMATED RECOVERY FROM A SPLIT SEGMENT CONDITION IN A LAYER2 NETWORK FOR TEAMED NETWORK RESOURCES OF A COMPUTER SYSTEM

(75) Inventors: Michael Sean McGee, Round Rock, TX (US); Michael Sean McIntyre, Austin, TX (US); Gregory Thomas Howard, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1547 days.

(21) Appl. No.: 11/048,523

(22) Filed: Feb. 1, 2005

(65) Prior Publication Data

US 2005/0281190 A1   Dec. 22, 2005

Related U.S. Application Data

(60) Provisional application No. 60/580,509, filed on Jun. 17, 2004.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |

(52) U.S. Cl. ........ 370/219; 370/220; 370/221; 370/227; 370/238; 370/244; 370/245; 370/250; 370/256

(58) Field of Classification Search .................. 370/216, 370/221, 219, 220, 225, 242, 247, 250, 255, 370/256, 257

See application file for complete search history.

(56) References Cited

U.S. PATENT DOCUMENTS

| 5,606,664 | A | * | 2/1997 | Brown et al. | 709/224 |
| 5,859,959 | A | * | 1/1999 | Kimball et al. | 714/4 |
| 6,173,411 | B1 | * | 1/2001 | Hirst et al. | 714/4 |
| 6,269,076 | B1 | * | 7/2001 | Shamir et al. | 370/217 |
| 6,308,282 | B1 | * | 10/2001 | Huang et al. | 714/4 |

(Continued)

OTHER PUBLICATIONS

Broadcom Gigabit Ethernet Teaming Services by Dell published on Apr. 20, 2004.*

(Continued)

*Primary Examiner* — Daniel J Ryman
*Assistant Examiner* — Nishant B Divecha

(57) ABSTRACT

A computer system automatically recovers from a split segment condition in which a contiguous layer 2 network segment, comprising a plurality of contiguous paths each directly coupling one or more members of a team of network resources of the computer system to a core switch of a layer 2 network, is split into two or more noncontiguous segments each comprising a contiguous set of one or more of the plurality of paths. The computer system includes a team of network resources having one or more members that couple it to each one of the plurality of paths. A teaming driver binds the drivers of each member of the team and is coupled to the segment through the members of the team. The teaming driver detects whenever the network segment has been split into two or more noncontiguous segments and then configures the team such that one of the members coupled to a path within each of the noncontiguous segments is designated as a primary resource thereby restoring connectivity of the isolated paths to the computer system.

46 Claims, 15 Drawing Sheets

U.S. PATENT DOCUMENTS

| | | | | |
|---|---|---|---|---|
| 6,937,576 | B1* | 8/2005 | Di Benedetto et al. | 370/256 |
| 2002/0126622 | A1* | 9/2002 | Kimball et al. | 370/235 |
| 2002/0156927 | A1* | 10/2002 | Boucher et al. | 709/250 |
| 2003/0016624 | A1* | 1/2003 | Bare | 370/217 |
| 2003/0179707 | A1* | 9/2003 | Bare | 370/235 |
| 2004/0218542 | A1* | 11/2004 | Lee | 370/248 |
| 2005/0080923 | A1* | 4/2005 | Elzur | 709/238 |
| 2005/0152319 | A1* | 7/2005 | Kubler et al. | 370/338 |

OTHER PUBLICATIONS

Fault Recovery Port-based Fast Spanning Tree Algorithm (FRP-FAST) for the Fault-Tolerant Ethernet on the Arbitrary Switched Network Topology by Song published in 2001.*

Fault-Tolerant Ethernet Middleware for IP-Based Process Control Networks by Song published in 2000.*

LocalDirector Network Implementation by Cisco published in 1999.*

* cited by examiner

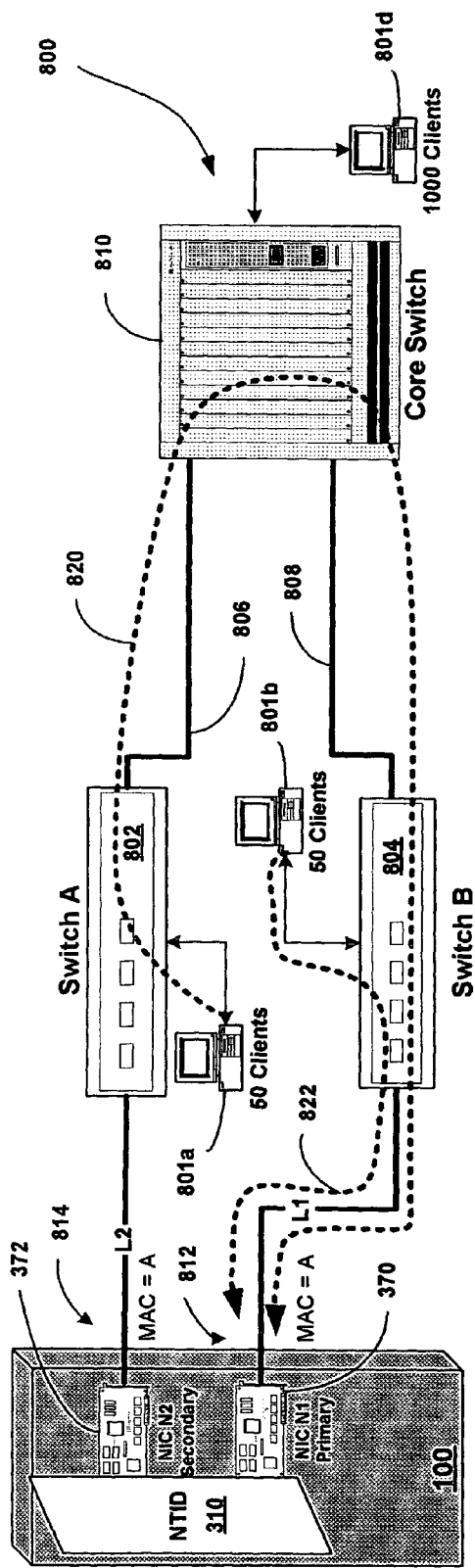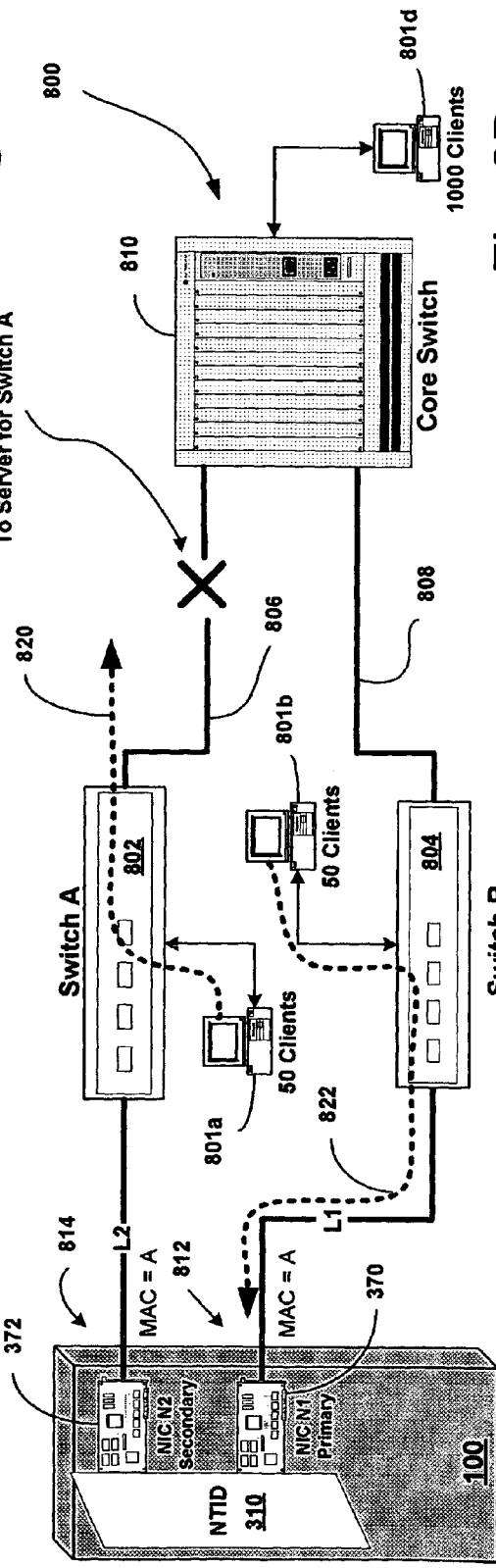

AUTOMATED RECOVERY FROM A SPLIT SEGMENT CONDITION IN A LAYER2 NETWORK FOR TEAMED NETWORK RESOURCES OF A COMPUTER SYSTEM

This ap1plication claims the benefit of U.S. Provisional Application No. 60/580,509, filed Jun. 17, 2004.

BACKGROUND

Computers and other devices are commonly interconnected to facilitate communication among one another using any one of a number of available standard network architectures and any one of several corresponding and compatible network protocols. The nature of standard architectures and their topologies is typically dictated at the first two layers of the OSI (Open Systems Interconnection) Basic Reference Model for networks, which are the physical layer (layer 1) and the data link layer (layer 2). One of the most commonly employed of such standard architectures is the Ethernet® network architecture. Other types of network architectures that are less widely used include ARCnet, Token Ring and FDDI. Variations of the Ethernet® standard are differentiated from one another based on characteristics such as maximum throughput (i.e. the highest data transmission rate) of devices coupled to the network, the type of medium used for physically interconnecting the devices (e.g. coaxial cable, twisted pair cable, optical fibers, etc.) and the maximum permissible length of the medium.

The 10Base-T and 100Base-T Ethernet® standards, for example, designate a maximum throughput of 10 and 100 Megabits per second respectively, and are coupled to the network over twisted pair cable. The 1000Base-T (or Gigabit) Ethernet® standard designates a maximum throughput of 1000 Mbps (i.e. a Gigabit per second) over twisted pair cable. Recent advancement in the speed of integrated circuits has facilitated the development of even faster variations of the Ethernet® network architecture, such as one operating at 10 Gigabits per second (10 Gbps) and for which the transmission medium is typically optical fibers. Of course, the greater the throughput, the more expensive the network resources required to sustain that throughput. Ethernet® is a registered trademark of Xerox Corporation.

Packet switched network protocols are commonly employed with a number of architectures such as the Ethernet® standard. These protocols are typically defined by layers 3 and 4 of the OSI and dictate the manner in which data to be transmitted between devices coupled to the network are formatted into packets for transmission. These protocols are independent of the architecture and topology by virtue of their separation as hierarchical layers of the OSI. Examples of such protocols include Transmission Control Protocol/Internet Protocol (TCP/IP), the Internet Protocol eXchange (IPX), NetBEUI and the like. NetBEUI is short for NetBIOS Enhanced User Interface, and is an enhanced version of the NetBIOS protocol used by network operating systems such as LAN Manager, LAN Server, Windows® for Workgroups, Windows®95 and Windows NT®. Windows® and Windows NT® are registered trademarks of Microsoft Corporation. NetBEUI was originally designed by IBM for IBM's LAN Manager Server and later extended by Microsoft and Novell. TCP/IP is typically used in Internet applications, or in intranet applications such as a local area network (LAN). The data packets received through a network resource of the destination device are processed in reverse according to the selected protocol to reassemble the payload data contained within the received packets. In this manner, computers and other devices can share information in accordance with these higher level protocols over the common network.

One of the most basic and widely implemented network types is the Local Area Network (LAN). In its simplest form, a LAN is a number of devices (e.g. computers, printers and other specialized peripherals) connected to one another by some form of signal transmission medium such as coaxial cable to facilitate direct peer-to-peer communication there between. A common network paradigm, often employed in LANs as well as other networks, is known as the client/server paradigm. This paradigm involves coupling one or more large computers (typically having very advanced processing and storage capabilities) known as servers to a number of smaller computers (such as desktops or workstations) and other peripheral devices shared by the computers known as clients. The clients send requests over the network to the one or more servers to facilitate centralized information storage and retrieval through programs such as database management and application programs stored on the server(s). Servers may also be used to provide centralized access to other networks and various other services as are known to those of skill in the art. The servers provide responses over the network to the clients in response to their requests. Clients and/or servers can also share access to peripheral resources, such as printers, scanners, and the like over the network.

LANs are sometimes coupled together to form even larger networks, such as wide area networks (WANs), or they may be coupled to the Internet. LANs may also be segmented into logical sub-networks called segments. This can be accomplished through the use of multiple switches that do not communicate with one another (i.e. they are noncontiguous) or through the creation of virtual LANs (VLANs). The isolation between VLANs and a particular network device's access to the segments are controlled by a switch that can be programmed in real time to couple network resources of that device to one, some or all of the VLAN segments.

For a given network architecture such as Ethernet®, various network topologies may be implemented. A network topology simply defines the manner in which the various network devices are physically interconnected. For example, the simplest topology for an Ethernet® LAN is a bus network. A bus network couples all of the devices to the same transmission medium (e.g. cable, optical fiber, etc.). One manner in which this is commonly accomplished is through use of a T-connector and two cables to connect one device to T-connectors coupled to each of its two neighbors on the network. The problem with the bus network approach is that if the interface for one of the devices fails or if one of the devices is removed from the network, the network bus must be reconnected to bypass the missing or malfunctioning device or the network is broken.

A better approach is to use a star topology, where all of the network devices are coupled together through a device such as a concentrator. A concentrator acts to consolidate all of the network connections to a single point, and is able to combine signals received from slower devices to communicate with a device capable of supporting a higher throughput. Thus, requests coming from several clients may be combined and sent to a server if the server has the ability to handle the higher data rate of the combined signals. Each of the network devices is coupled through one connector to the concentrator, and if any one of the devices is removed from the network, the other devices can continue to communicate with one another over the network without interruption.

Another topology that may be used when higher bandwidth is desired is a hub network. A hub network is similar to the bus network described above in that it involves a single connective medium through which a number of devices are interconnected. The difference is that for a hub network, the devices coupled to the single connector are hub devices rather than single network devices. Each hub device can couple a large number of network devices to the single connector. The single connector, called a backbone or core switch, can be designed to have a very high bandwidth sufficient to handle the confluence of data from all of the hubs.

Network interface resources are required to couple computers and other devices to a network. These interface resources are sometimes referred to as network adapter cards or network interface cards (NICs), each adapter card or NIC having at least one port through which a physical link is provided between the network transmission medium and the processing resources of the network device. Data is communicated (as packets in the case of packet switched networks) from the processing resources of one network device to the other. The data is transmitted and received through these interface resources and over the media used to physically couple the devices together. Adapter cards or NICs are commercially available that are designed to support one or more variations of standard architectures and known topologies.

Each of the network devices typically includes a bus system through which the processing resources of the network devices may be coupled to the NICs. The bus system is usually coupled to the pins of edge connectors defining sockets for expansion slots. The NICs are coupled to the bus system of the network device by plugging the NIC into the edge connector of the expansion slot. In this way, the processing resources of the network devices are in communication with any NICs or network adapter cards that are plugged into the expansion slots of that network device. As previously mentioned, each NIC or network adapter must be designed in accordance with the standards by which the network architecture and topology are defined to provide appropriate signal levels and impedances (i.e. the physical layer) to the network. This of course includes an appropriate physical connector for interfacing the NIC to the physical transmission medium employed for the network (e.g. coaxial cable, twisted-pair cable, fiber optic cable, etc.).

It is desirable that certain connections (e.g. access by clients to network server(s)) be as reliable as possible. It is also desirable that some network devices (e.g. network server(s)) be able to receive and respond to numerous incoming requests from other devices on the network (such as clients) as quickly as possible. As processing speed continues to increase and memory access time continues to decrease for a network device such as a server, the bottleneck for device throughput becomes pronounced at the interface to the network. While network architectures and associated network adapters are being designed to handle ever-increasing throughput rates, the price for implementing interface resources supporting the highest available throughput is not always cost-effective.

In light of the foregoing, it has become common to improve the reliability and throughput of a network by coupling some or all of the network devices to the network through redundant network resources. These redundant links to the network may be provided as a plurality of single-port NICs, one or more NICs each having more than one port or a combination thereof. Teaming of network interface resources is particularly common for servers, as the demand for throughput and reliability is typically greatest for servers on a network. Resource teams are typically two or more NICs (actually two or more NIC ports) logically coupled in parallel to appear as a single virtual network adapter to the other devices on the network. These resource teams can provide aggregated throughput of data transmitted to and from the network device employing the team and/or fault tolerance (i.e. resource redundancy to increase reliability).

Fault tolerant teams of network resources commonly employ two or more network adapter or NIC ports, one port being "active" and configured to operate as the "primary," while each of the other members of the team are designated as "secondary" and are configured to operate in a "standby" mode. A NIC or NIC port in standby mode remains largely idle (it is typically only active to the limited extent necessary to respond to system test inquiries to indicate to the team that it is still operational) until activated to replace the primary adapter when it has failed. In this way, interruption of a network connection to a critical server may be avoided notwithstanding the existence of a failed network adapter card or port.

Load-balancing teams of network resources combine one or more additional network adapters or NICs to increase the aggregate throughput of data traffic between the network and the device. In the case of "transmit" load balancing (TLB) teams, throughput is aggregated for data transmitted from the device to the network. The team member configured to operate as primary, however, handles all of the data received by the team. In the case of "switch-assisted" load balancing (SLB) teams, throughput is balanced over all team members for data transmitted to the network as in TLB teams as well as data received by the team from the network. Typically, the received data is balanced with the support of a switch that is capable of performing load balancing of data destined for the team.

Load-balancing teams employ various algorithms by which network traffic through the team is balanced between the two or more network adapter cards, with transmit load-balancing algorithms usually residing in the transmitting network device, and the receive data load-balancing algorithm residing in the switch to which the team is coupled. Load-balancing teams inherently provide fault tolerance, but most commonly at a lower aggregate throughput than the fully functional team. Employing multiple network resources in tandem can enable a server to meet increasing demands for throughput where one NIC or NIC port would have become saturated (i.e. reached its maximum throughput) without meeting all of the demand. This can happen at a server NIC or NIC port, for example, as more client computers are added to a growing network or as processing capability of existing clients is upgraded, leading to an increase in the rate of client requests and responses to and from the server.

Certain configurations for NFT and TLB teams are designed to achieve switch redundancy in a network. This means that one or more NICs in a team are attached to two or more switches. A NIC team that is attached to a network must still have all members of the team belong to the same broadcast domain (i.e. same layer 2 network). In other words, all NICs have to be able to see each other's broadcasts. This is required so that the team knows that all team members can communicate with the same set of clients. Thus, these switch-redundant configurations require that the switches ultimately be interconnected in some way—either directly or by way of uplinks to a third switch (e.g. a backbone or core switch).

In a switch redundant configuration as described above, each path of the contiguous layer 2 network segment has at least one switch that serves a different group of clients or other network devices. If one of the switches fails, then the team will fail over to (i.e. assign as a new primary) one of the other NIC members still attached to a functioning switch. It is possible, however, for this type of configuration to suffer a failure in an uplink to the core switch rather than a switch itself. In this case, team members can become isolated on newly created LAN segments that are no longer contiguous with the switch path coupled to the current primary member of the team. If the team becomes split between two or more different network segments as the result of such a failure, the clients on the isolated network segments (the ones to which the primary is not coupled) will no longer be able to communicate with the team. This is because an NFT and a TLB team receive data for the entire team only through the primary member (for the NFT team, the primary transmits data for the entire team as well). Because there is only one primary member per team, only those paths still contiguous with the path coupled to the primary team member will have communication with the team and therefore the server.

If no redundant connection is available between switches in the isolated paths by which to bypass the fault in the connection to the core switch, the clients on the isolated path(s) will be isolated and lose connectivity to the computer system and possibly the core network. If the failure occurs in the primary path, the core switch itself becomes isolated from the computer system as well as all of the non-primary paths. In the past the only way connectivity could be restored was through physical intervention by a user to repair the fault in the connection. There was no automated recovery process by which connectivity to the server could be restored until the fault in the uplink was repaired.

SUMMARY OF THE INVENTION

An embodiment of a method of the invention automatically recovers from a split segment condition in which a contiguous layer 2 network segment, including a plurality of contiguous paths each directly coupling one or more members of a team of network resources of a computer system to a core switch of a layer 2 network is split into two or more noncontiguous segments each comprising a contiguous set of one or more of the plurality of paths. The method detects whenever the network segment has been split into two or more noncontiguous segments and re-configures the team such that one of the members coupled to a path within each of the noncontiguous segments is configured to operate as a primary resource

BRIEF DESCRIPTION OF THE DRAWINGS

For a detailed description of embodiments of the invention, reference will now be made to the accompanying drawings in which:

FIG. 6A is a network diagram illustrating a layer2 network segment to which a computer system is coupled that features an embodiment of the invention;

FIG. 6B is the network diagram of FIG. 6A illustrating the effect of a failure on a switch uplink in one of the various paths in the network segment;

NOTATION AND NOMENCLATURE

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NICs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may employ one type of network architecture and/or topology, those of skill in the art will recognize that the invention(s) disclosed herein can be readily applied to all other compatible network architectures and topologies.

Figure 1:
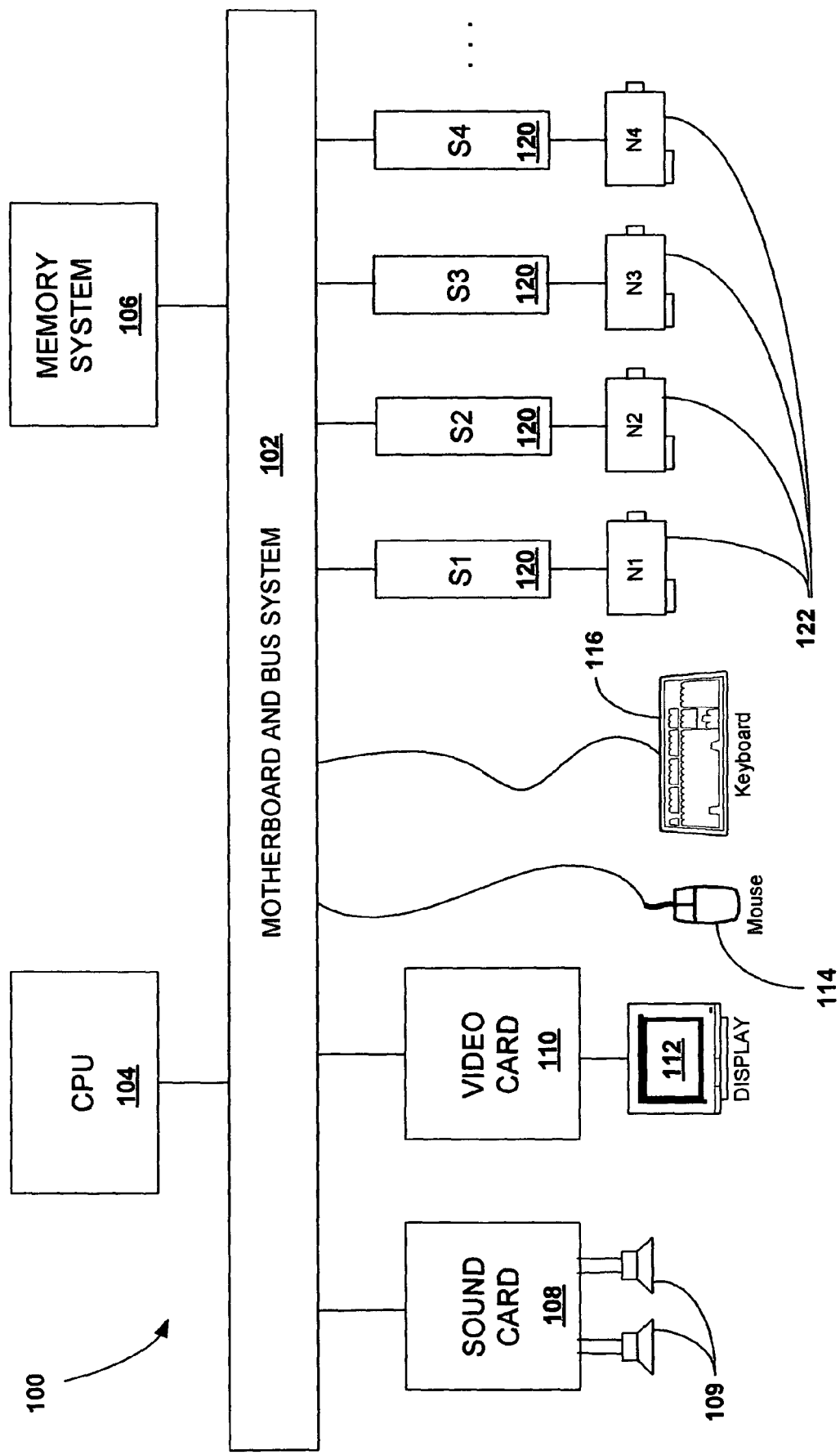
FIG. 1 is a block diagram that illustrates various features of a computer system, including some features by which the computer system is coupled to a network in accordance with an embodiment of the present invention.

FIG. 1 is a block diagram of a computer system 100 that illustrates various features of a computer system 100, including some of those features used to couple it to a network in accordance with an embodiment of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 are shown coupled to the respective slots S1-S4. The bus implemented for slots 120 and the NICs 122 is typically dictated by the design of the adapter card itself.

As described more fully below, each of the NICs 122 enables the computer system to communicate through at least one port with other devices on a network to which the NIC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of load balancing and/or fault tolerance. Additionally, two or more of the NICs (or NIC ports) 122 may be split between distinct paths or segments of a network that ultimately connect to a core switch.

If employed in a packet-switched network, each of the NICs 122 (N1-N4) of FIG. 1 transmits to and receives from the network, packets (e.g. Ethernet® formatted packets or the like) generated by the processing resources of the transmitting network device. The formatting of the packets is defined by the chosen transmission protocol as previously discussed. It will be understood by those skilled in the art that each device on a network uses one or more unique addresses by which it communicates with the other devices on the network. Each address corresponds to one of the layers of the OSI model and is embedded in the packets for both the source device as well as the destination device. Typically, a device will use an address at layer 2 (the data link layer) known as a MAC (media access control) address and an address at layer 3 (the network layer) known as a protocol address (e.g. IP, IPX AppleTalk, etc.). The MAC address can be thought of as being assigned to the physical hardware of the device (i.e. the adapter or NIC port providing the link to the network) whereas the protocol address is assigned to the software of the device. When multiple protocols reside on the same network device, a protocol address is usually assigned to each resident protocol.

For Ethernet® networks, devices communicate directly using their respective MAC (i.e. layer 2) addresses, even though the software for each device initiates communication with one or more other network devices using their protocol addresses. Ethernet® devices must first ascertain the MAC address corresponding to a particular protocol address identifying a destination device. For the IP protocol, this is accomplished by first consulting a cache of MAC address/protocol address pairs maintained by each network device. If an entry for a particular protocol address is not there, a process is initiated whereby the sending device broadcasts a request to all devices on the network for the device having the destination protocol address to send back its MAC address. This is known as ARP (address resolution protocol), the result of which is then stored in the cache. The packets are then formed by embedding the source and destination addresses, which are at least 48 bits, as well as embedding the source and destination protocol addresses in the payload of the packet so that the receiving device knows to which device to respond. For the IPX protocol, the ARP process is not required because the MAC address is a constituent of the IP address.

There are three types of layer 2 and layer 3 addresses. A directed or unicast packet includes a specific destination address that corresponds to a single network device. A multicast address corresponds to a plurality of devices on a network, but not all of them. A broadcast address, used in the ARP process for example, corresponds to all of the devices on the network. A broadcast bit is set for broadcast packets, where the destination address is all ones (1's). A multicast bit in the destination address is set for multicast packets.

Figure 2:
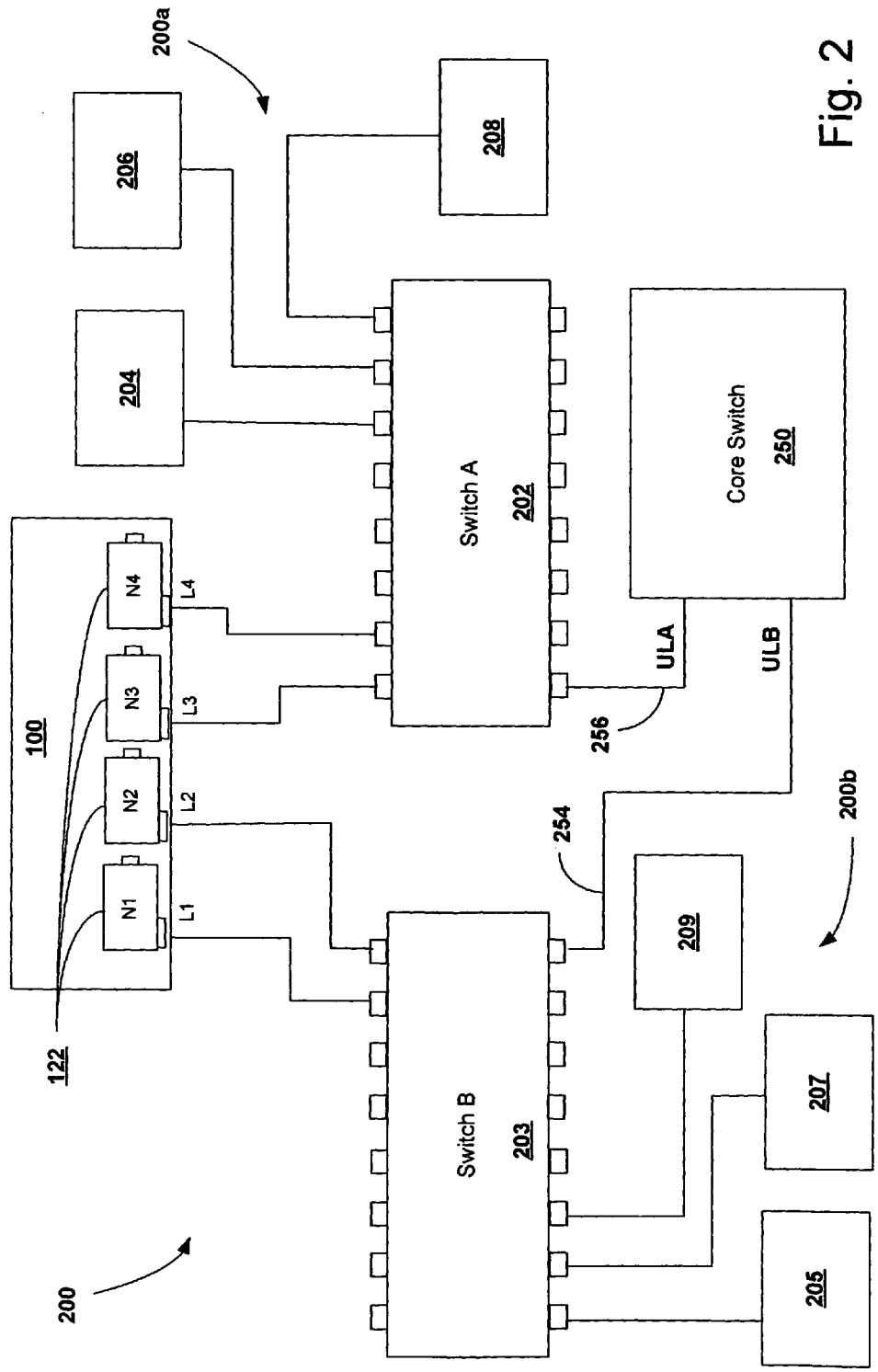
FIG. 2 is a block diagram of a network that illustrates some features used to couple the computer system of FIG. 1 to the network in accordance with an embodiment of the present invention.

Referring now to FIG. 2, a block diagram of a layer 2 network 200 that includes two contiguous paths 200a and 200b to core switch 250 is shown. Computer system 100 communicates with one or more other devices, such as devices 204, 206, and 208 through network device 202 over path 200a and devices 205, 207, 209 through network device 203 over path 200b. The devices 204 through 209 may be of any type, such as another computer system, a printer or other peripheral device, or any type of network device, such as a hub, a repeater, a router, a brouter, etc. Multiple port network devices 202, 203 can be for example a concentrator, hub, switch or the like.

The computer system 100 is coupled to ports of the network device Switch A 202 by way of links L3 and L4. The computer system 100 is further coupled to the network device Switch B 203 via links L1 and L2. The NICs N1-N4 122 are shown to provide one NIC port (and thus one link) each. As previously discussed, these NICs may also be multi-port devices or a combination of both single and multi-port NICs. It is noted that the computer system 100 may be coupled to the network devices 202, 203 via any number of links from one to some maximum number such as sixteen (16), primarily limited by the number of expansion slots available.

The network 200 of FIG. 2 illustrates the use of teamed interface resources of the computer system 100 to provide two or more redundant links to the contiguous network segment that includes two paths 200a, 200b to a core switch 250 through redundant switches A 202 and B 203 respectively. The example of FIG. 2 further illustrates the members of the team (i.e. ports P1-P4) equally between the two paths of the segment. The team of ports P1-P4 can provide benefits including load balancing and/or fault tolerance, depending upon whether the team is configured to be a TLB or NFT team respectively. The key to teaming two or more NIC ports is to make the team look like a single virtual interface resource or virtual port to the other devices (i.e. devices 202-209) on the same network or sub-network. This is typically accomplished by assigning one primary MAC address and one protocol (e.g. IP) address to the entire team.

Figure 3:
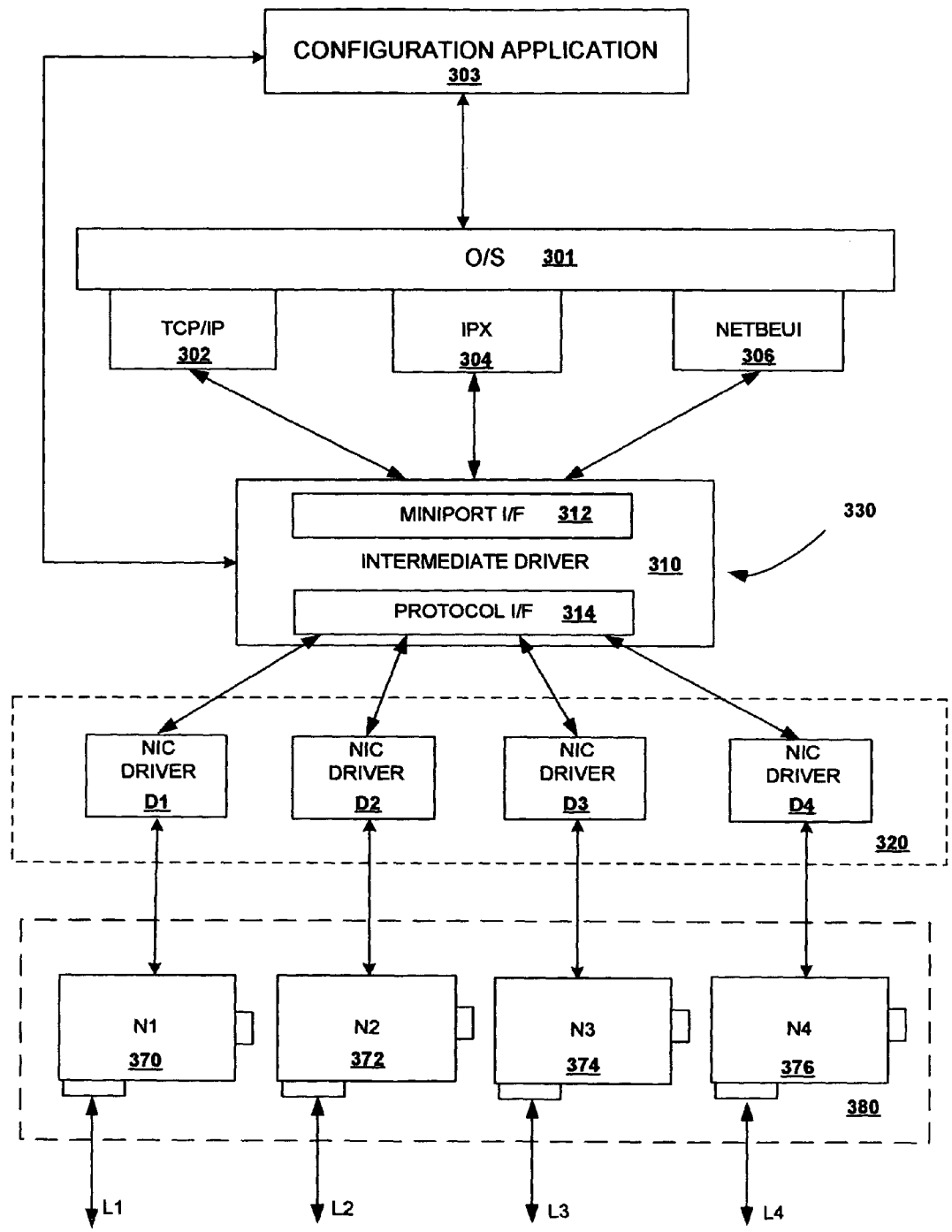
FIG. 3 is a block diagram illustrating some of the components of a controller system installed on the computer system of FIG. 1 and implemented to enable teaming of network resources in accordance with an embodiment of the invention.

A more detailed discussion regarding the teaming mechanism of an embodiment of the invention is now presented with reference to FIG. 3. As previously mentioned, for a team of network adapter ports to operate as a single virtual adapter, all devices on the network must communicate with the team using only one layer 2 address and one layer 3 address. Put another way, a network device must see only one layer 2 (e.g. MAC) address and one protocol address (e.g. IP, IPX) for a team, regardless of the number of adapter ports that make up the team. For the IP protocol address of an Ethernet network, this means that a team will have only one entry in its ARP table (i.e. one MAC address and one IP address) for the entire team.

FIG. 3 is a block diagram illustrating the primary components of an embodiment of a controller system 300 installed on the computer system 100 that enables teaming of any number of NIC ports to create a single virtual or logical device. In the embodiment shown in FIG. 3, computer system 100 is configured with four NICs N1-N4 370, 372, 374, 376 and instantiations of their associated drivers D1, D2, D3 and D4 for purposes of illustration. Each instantiation of a driver D1 through D4 is the driver necessary to control each of the single-port NICs N1-N4 370-374. Drivers D1-D4 may be instances of the same driver if N1-N4 are identical NICs, or they may be different drivers if their associated one of the NICs N1-N4 is also a different NIC.

The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol exchange) 304, NetBEUI (NETwork BIOS End User Interface) 306, etc. A configuration application 303 program runs in conjunction with O/S 301.

An embodiment of configuration application 303 provides a graphical user interface (GUI) through which users may program configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for displaying teaming configurations and resource status are disclosed in detail in U.S. Pat. No. 6,229,538 entitled "Port-Centric Graphic Representations of Network Controllers," which is incorporated herein in its entirety by this reference. Application 303 provides commands by which the resources can be allocated to teams and reconfigured. A user can interact with the configuration program 303 through the GUIs via one or more input devices, such as the mouse 114 and the keyboard 116 and one or more output devices, such as the display 112.

A hierarchy of layers within the O/S 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302, 304 and 306 interface with the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver makes the group of miniport drivers for each of the NIC ports to be teamed, function seamlessly as one driver that interfaces with the NDIS layer. Thus, the intermediate driver makes the NIC drivers of a team appear to be one NIC driver controlling one NIC port. Prior to the introduction of teaming and the intermediate driver layer 310, a protocol address typically was assigned to each individual network adapter (or NIC) driver at the Miniport Driver Layer 312. In the case of teaming, however, a single protocol address is typically assigned to each instance of the intermediate driver. Thus, the first requirement for teaming has been accomplished with a single protocol address being assigned to each team. For each team of NIC adapter ports, there will be a separate instance of the intermediate driver at the Intermediate Driver Layer 310, each instance being used to tie together those NIC drivers that correspond to the NIC ports belonging to that team.

In this manner, the intermediate driver 310 appears as a single NIC driver to each of the protocols 302-306. Also, the intermediate driver 310 appears as a single protocol to each of the NIC drivers D1-D4 and corresponding NICs N1-N4. The NIC drivers D1-D4 (and the NICs N1-N4) are bound as a single team 320 as shown in FIG. 3. Because each instance of the intermediate driver can be used to combine two or more NIC drivers into a team, a user may configure multiple teams of any combination of the ports of those NICs currently installed on the computer system 100. By binding together two or more drivers corresponding to two or more ports of physical NICs, data can be transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports providing redundant links L1 through L4 to network 200 of FIG. 2 could be configured as a network fault tolerance (NFT) team. For an NFT team, one of the links (e.g. link L1 provided by a first port of the corresponding NIC N1 370 in FIG. 3) is initially designated (i.e. configured to operate) as the primary and is therefore "active." This assignment can be accomplished by default (e.g. the teaming driver 310 simply chooses the team member located in the lowest numbered slot as the primary member). The assignment of the primary could also be accomplished by way of the user manually dictating the choice to the teaming driver 310 through the GUI of the configuration application 303. In the default example of FIG. 3, the second through fourth links of the team (e.g. L2-L4 provided by the ports P2-P4 by NICs N2 and N3) are then configured to operate as "secondary" members and as such are placed in a "standby" mode.

Thus, the primary member transmits and receives all packets on behalf of the team. If the active link (i.e. L1) fails or is disabled for any reason, the computer system 100 can detect this failure and switch to one of the secondary links by rendering it the active (and primary) link of the team while placing the failed link L1 in failed mode (and designating it a secondary resource). This process is sometimes referred to as "failover." Communication between computer system 100 and devices 201-209, 250 in FIG. 2 is thereby maintained without any significant interruption. Those of skill in the art will recognize that an embodiment of an NFT team can have any number of redundant links in an NFT team, and that one link of the team will be active and all of the others will be in standby.

Figure 4A:
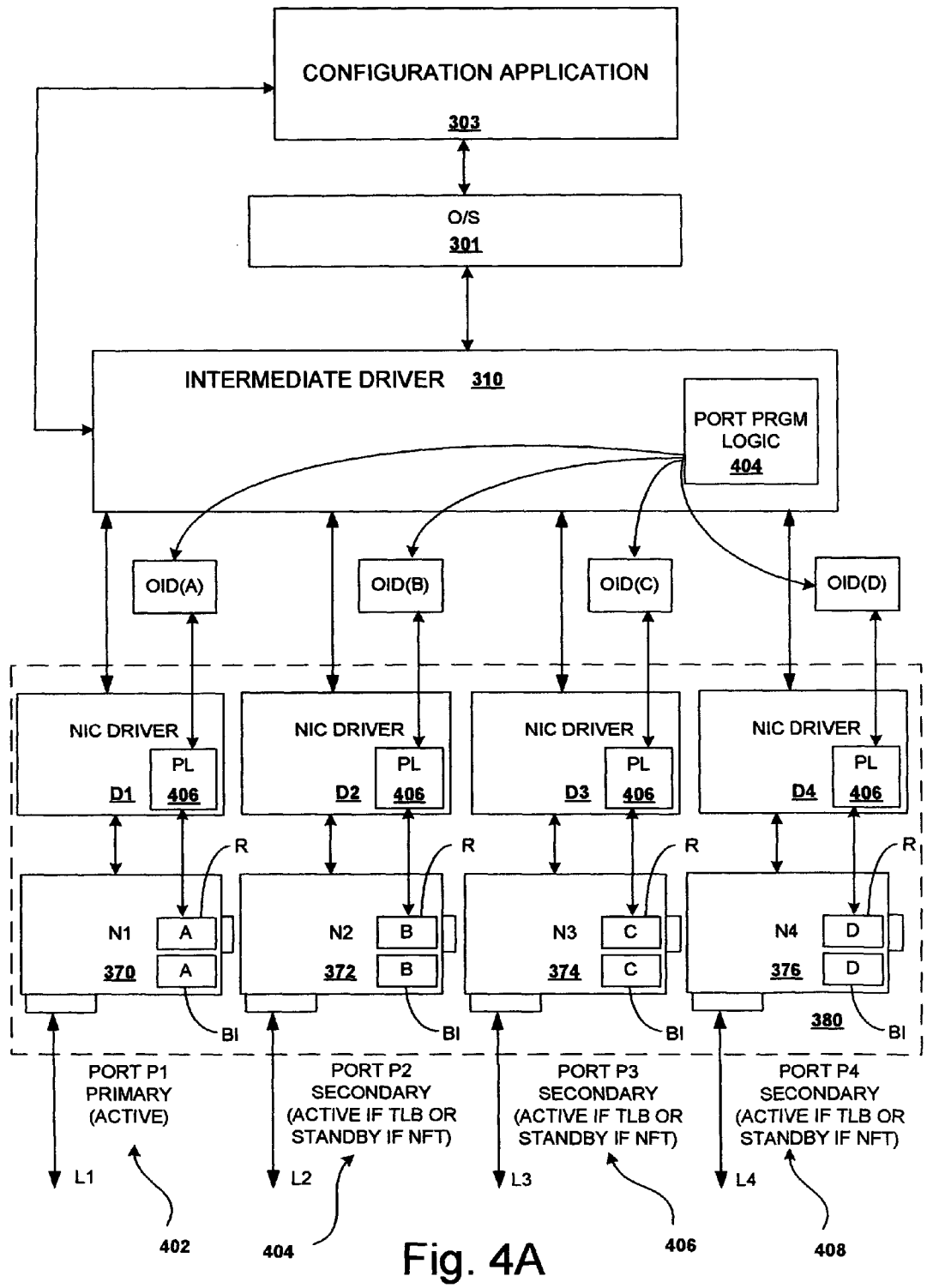
FIG. 4A is a block diagram illustrating network resources of the computer system of FIG. 1 configured as a NFT or TLB team in accordance with an embodiment of the invention.

FIG. 4A is a block diagram illustrating an embodiment of system 100 with a team of four single-port NICs that reflects the assignment of the teamed resources as a network fault tolerant (NFT) team or as a transmit load-balanced (TLB) team; that is one team member is configured to operate as a primary and the other members are configured to operate as secondary members. In both cases, the primary is operable to send and receive data. The difference between the two team types is that for a NFT team, the secondary members are in standby mode and the primary does all of the transmitting and receiving for the team, whereas for a TLB team the primary does all of the receiving and the secondary members are operable for transmitting but not receiving.

An instantiation of the intermediate driver 310 is created for the team upon commands from configuration application 303. Upon initialization, the instance of the teaming driver 310 for the team first reads the BIA (burned-in MAC address) for each member of its team. In FIG. 4A the factory assigned MAC addresses are referred to as A, B, C and D, respectively. The teaming driver then picks one MAC address from the team's pool of BIAs and assigns that to a primary adapter or NIC port. In the example of FIG. 4A, port P1 402 is designated (by default) by the teaming driver 310 to be the primary and active port for the team and is assigned the MAC address for the team. The MAC address assigned to port P1 402 is then written to override register R and all of the remaining ports P2-P4 404, 406, 408 become secondary ports that are programmed with one of the remaining MAC addresses from the pool. For a NFT team the secondary resources are initially placed in standby mode. For a TLB team the secondary resources are placed in active mode. For an NFT team, only the primary receives data from or transmits data to the network on behalf of the computer system 100. For a TLB team, the data received from the network is always received at the primary, while data transmitted from system 100 is balanced over all of the resources. In this case, the MAC address assignments are the same as the BIAs.

The teaming driver 310 includes port program logic 404 that can command the NIC drivers D1-D4 to program the override register R of each of the NICs with the MAC address assignments from the pool. Each of the NIC drivers D1-D4 includes program logic 406 that receives a command, including the override receive address, from the port program logic 404 of the intermediate driver 310. The commands can be issued in the form of an Operation Identifier (OID) to each of the individual NIC drivers D1-D4. Standard NIC drivers are typically designed to recognize a plurality of standard OIDs that are usually sent from the upper level protocols. The override receive address OID used to program the receive address override register is not typically included as a standard OID.

Until the team is reconfigured, the MAC address assigned to the primary adapter is the single MAC address for the team. It should be noted that a user could program the MAC addresses for each of the team members manually. Because there is only one instance of the network teaming ID for each team, and the Layer 3 address is assigned to the ID, there is likewise only one IP address assigned to the team.

Figure 4B:
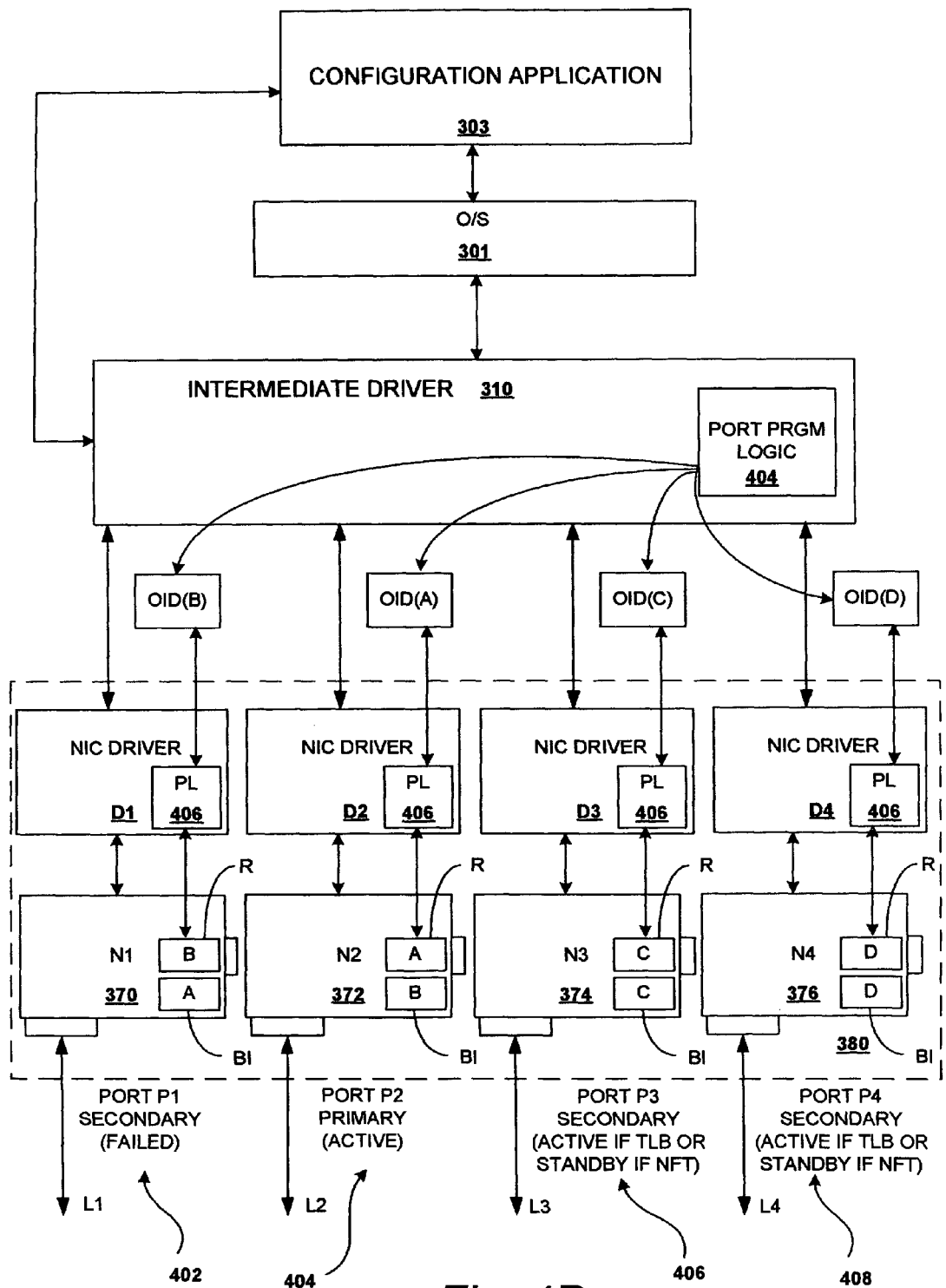
FIG. 4B is a block diagram of the NFT or TLB team of FIG. 4A after a failover condition in accordance with an embodiment of the invention.

For an NFT team, if the currently active port becomes disabled or fails for any reason, a failover occurs whereby a secondary port is configured to be the active and primary port. FIG. 4B illustrates the team of FIG. 4A after a failover. The MAC addresses between ports P1 402 and P2 404 have been swapped and port P2 404 becomes active and the primary for the NFT team. The NIC 370 providing port P1 402 is placed in a "failed" mode and the failed status of the port P1 402 is communicated by the teaming driver 310 back to the configuration application 303. Likewise, the new "active" status for the NIC 372 providing port P2 404 is also sent to the configuration application 303. If the network device to which the team is coupled is a hub or a repeater, no other change is necessary. If the network device is a switch, the switch learns that the virtual device (i.e. the team) with source address A has moved from link L1 to L2, and begins sending packets with destination MAC address A to the computer system 100 via the link L2.

Thus, when operating in the FT Switch On Fail Mode, the intermediate driver 310 detects failure of the primary port P1 402 and fails over to one of the secondary ports, such as the port P2 404 and the NIC N2 372 as shown in FIG. 4B. The intermediate driver 310 stays with the new primary port P2 404 until it fails, and if so, selects another operable secondary port to be configured as the new primary member. If operating in the FT SmartSwitch Mode, after failover from the primary port, such as the port P1 404, the intermediate driver 310 switches back to the previously designated primary port P1 402 if and when the intermediate driver 310 detects the NIC N1 370 is again operable because either it has been repaired or replaced. In any of the fault tolerance (FT) modes, the significant advantage of the single receive address mode is that a failover does not require the entire network to recognize a change of the receive address to that of the new primary port. Because all of ports P1-P4 in the team are programmed with the same receive address A, the failover can occur as soon as the intermediate driver 310 detects failure of the primary port. After the failover as shown in FIG. 4B, the intermediate driver 310 inserts the address A as the source address of the new primary port P2 404, which is properly handled by the network device 200, 203 of FIG. 2 regardless of whether it is a switch, hub or repeater.

As previously mentioned, load balancing teams can be configured to achieve transmit load balancing or both transmit and receive load balancing. Transmit load balancing (TLB) teams are typically employed when fault tolerance is desired as well as throughput greater than that available through the single primary resource port of an NFT team. This is common for situations such as when the computer system 100 is acting as a database server and its primary role is to transmit data to numerous clients. In this example, its receive throughput requirements are significantly less than that of its transmit throughput requirements and the receive throughput requirements can be handled by the primary adapter alone.

As an example, data throughput can be increased between computer system 100 and network devices coupled to a network (e.g. devices 203-209 coupled to layer 2 network 200, FIG. 2) if the NIC ports providing redundant links L1-L4 are configured as a load balancing team. For TLB teams, one of the ports is designated the primary port, just as in the case of an NFT team, but in this case all secondary members of the team are also active for transmitting data. The port designated as the primary is still responsible for receiving all data sent from the devices 203-209 back to the computer system 100. The data to be transmitted is balanced among the primary and secondary ports in accordance with any of a number of load balancing algorithms known to those of skill in the art.

Failover for a TLB team is quite similar to that for an NFT team. If failure occurs on a secondary port, it is simply placed in a failed mode and transmit data is balanced over one fewer port. If the failed port is the primary, the MAC address for the failed primary is swapped with the MAC address assigned to one of the secondary ports, and the secondary port becomes the primary while the failed port becomes a secondary and is placed in a failed mode. The MAC address of the team therefore remains the same. FIGS. 4A and 4B illustrate both NFT and TLB teams. The only difference is whether the secondary ports are configured to be in standby mode (NFT teams) or active (TLB teams).

Figure 5:
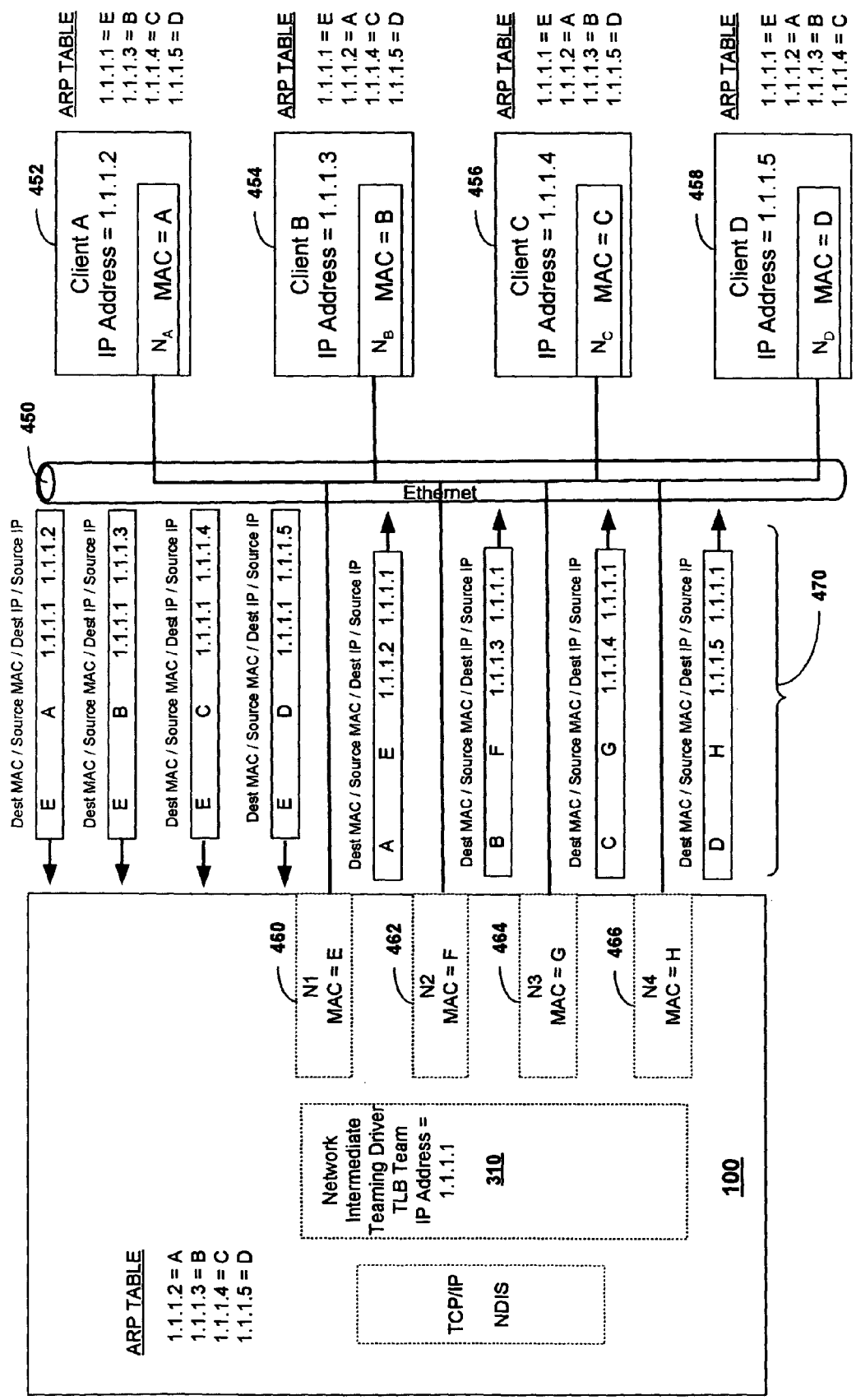
FIG. 5 is a block diagram illustrating network resources of the computer system of FIG. 1 configured as a TLB team in accordance with an embodiment of the invention.

FIG. 5 illustrates a team configured for transmit load balancing. In this example, NIC N1 460 is designated as the primary. NICs N2 462, N3 464 and N4 466 are also active. Each NIC of system 100 is transmitting with its assigned MAC address as indicated by the addressing information for packets 470 being sent to clients 452, 454, 456 and 458 over network 450. In this example, the traffic is balanced such that each NIC N1-N4 of system 100 is handling the traffic between system 100 and one of the clients 452, 454, 456 and 458. All of the traffic sent from the clients back to computer system 100 is received by primary NIC N1 460 at MAC address E.

It should be noted that for a TLB load balancing team, each active member (i.e. not failed) of the team transmits data with its own MAC address. This is not a problem for Ethernet networks employing IP as its network protocol because all source MAC addresses are stripped from packets by the receiving network devices and only the source team IP address is used to respond back to the team. For networks employing IPX as a protocol, this is not an issue because the source MAC address is only embedded within the IPX protocol address. During an ARP to a team, only the team MAC address is returned to the requesting device and is stored in its ARP cache.

FIG. 6A illustrates a topology similar to that of FIG. 2, except that the team of resources has been reduced to the two NICs NIC 1 and NIC 2 (and thus two NIC ports P1 and P2) for simplicity. Otherwise, the two team members NIC 1 and NIC 2 are split between two paths to core switch 810 through two redundant switches Switch A 802 and Switch B 804, just as the team of four NICs N1-N4 of FIG. 2. Each switch services, for example, up to fifty clients represented by desktop PC symbols 801a and 801b respectively. The core switch 810 services additional network devices 801d. For purposes of this discussion, the team comprising NIC 1 and NIC 2 can be either a NFT or a TLB team.

Initially, when configuring the team of FIG. 6A the NIC teaming intermediate driver (NTID) 310 designates (i.e. configures) the NIC1 370 as the primary NIC for the team in the manner previously discussed. Thus, all packets received by the team from clients 801a, 801b and 801d coupled to either Switches A 802 and B 804 or coupled to core switch 810, are received by the primary NIC N1 370 over link 1 to port P1 812. It follows that all packets received from clients 801a coupled to Switch A 802 must pass through core switch 810 and then through Switch B 804 to port P1 812 as illustrated by path 820. All packets received by the team from clients 801b coupled to Switch B 804 are received by NIC N1 370 over path 822. One could label path 822 the "primary" path and path 820 a secondary path. As previously described, if the team is an NFT team, all packets transmitted from computer system 100 are also transmitted through the primary member NIC N1 370 and port 812 as well. For a TLB team, packets destined for clients 801a, 801b and 801d can be transmitted by either NIC N1 370 or NIC N2 372, depending upon the load balancing algorithm used. In this case transmit traffic from system 100 can be traversing both paths to the core switch 810. Thus, packets sent to clients on Switches A 802 and B 804 by system 100 must traverse the same paths, but in reverse. Consistent with previous description of the teaming process, clients/devices 801a and 801b (as well as clients/devices 801d coupled to the core switch 810) all communicate with the team using the team MAC address which in the case of the example team of FIG. 6A is MAC address=A.

As previously discussed, a fault occurring in an uplink of one of the switches can isolate the secondary path from the primary path, thereby splitting the once contiguous network or network segment into two noncontiguous segments. For example, in FIG. 6B the failure in uplink 806 cuts off the secondary path 820 from the core switch 810. Thus, packets being transmitted by Clients 801a cannot reach the primary NIC N1 370 through the core switch 810. In this case, although Switch A 802 continues to operate and proper link is maintained with NIC N2 372, the clients 801a can no longer communicate with the server 100.

Figure 6C:
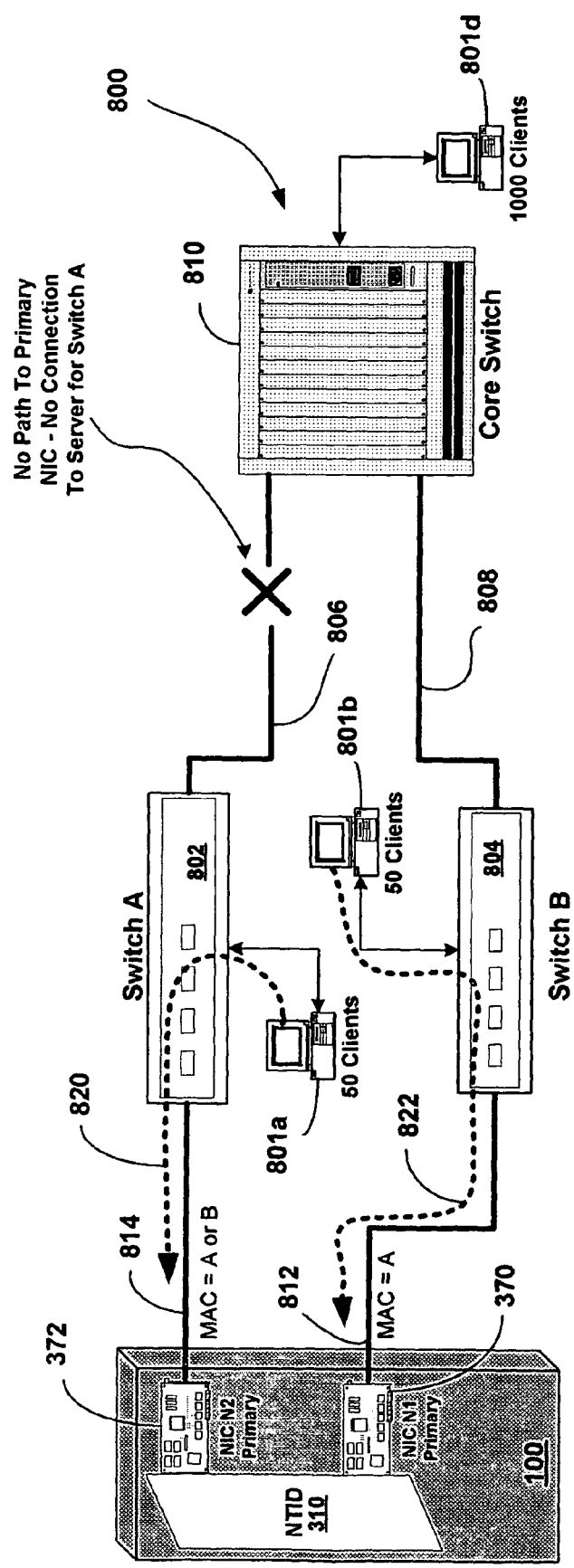
FIG. 6C is the network diagram of FIGS. 6A and 6B illustrating the computer system operating in a split segment recovery mode in accordance with an embodiment of the invention.

In an embodiment of the invention, the teaming driver 310 automatically restores and maintains full client-to-server communication in the event that teamed NICs become isolated on separate layer 2 segments because of switch uplink failure such as the condition illustrated in FIG. 6B. In an embodiment, the teaming driver 310 is operable to detect a split segment condition such as the one illustrated in FIG. 6B and to recover connectivity for all isolated paths of the original segment. Once a split segment condition is detected, the teaming driver 310 changes the status of certain team members such that each isolated segment has its own primary NIC coupled thereto. Doing so ensures that a receive path back to the server is established for each of the split segments, in addition to the original primary path. Connectivity to the computer system 100 is thereby restored to all clients until the link failure can be repaired. This new configuration is illustrated in FIG. 6C. As can be seen, the return path 820 for clients 801a is now provided through NIC N2 372 also acting as a primary. The teaming driver then 310 monitors for and detects restoration of the uplink and in response returns the team back to a standard operating mode for the team type, with only one primary again for the entire team (e.g. FIG. 6A).

Figure 7:
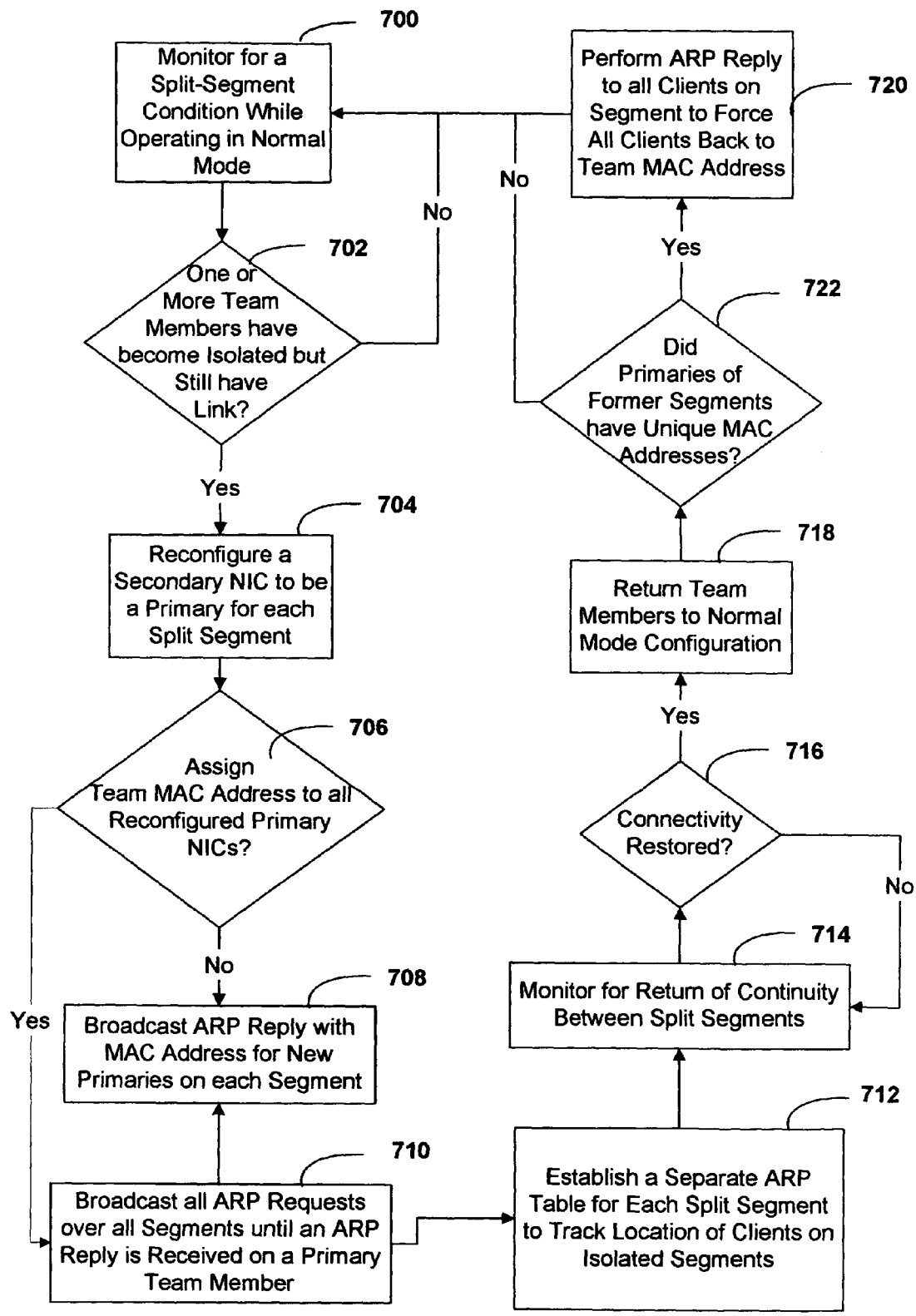
FIG. 7 is a procedural flow diagram for an embodiment of the invention.

FIG. 7 illustrates a procedural flow diagram of an embodiment of the invention that accomplishes the process described above. At 700, the teaming driver has the team configured in a "normal" mode. Thus, regardless of whether the team is a TLB or NFT team, the team has only one member configured to operate as a primary. While in the normal mode, the teaming driver 310 of system 100 monitors operation of the team to detect when one of its team members becomes isolated. Those of skill in the art will recognize that a number of possible techniques can be employed by which the teaming driver 310 could detect when one of its team members becomes isolated. In an embodiment, the teaming driver can send special heartbeat packets on a periodic basis between the various team members through their respective paths to ensure that they are being received through paths which would indicate that all of the NICs of the team are still coupled to the common broadcast domain. Should a team member fail to receive a heartbeat packet, but the team member still has appropriate physical link with the network, then the teaming driver will recognize this teaming driver and its path as having become isolated (i.e. noncontiguous) with the rest of the layer 2 segment.

In another embodiment, the teaming driver 310 can monitor Spanning Tree data that is often transmitted between contiguous switches on a network segment or subnet to manage the traffic flow through very complex networks over the switches, routers and bridges that provide interconnection of various network segments and subnets. As part of this information transfer process, Spanning Tree designates one of the switch devices of a contiguous broadcast domain as the "root" switch of the domain. Each such domain has only one root switch. As long as the Spanning Tree data received by the teaming driver indicates that there is only one root switch, this indicates that the segment to which the team is coupled remains contiguous. If the teaming driver detects more than one root switch coupled to the team members, then the teaming driver will recognize that each path of the original segment that is coupled to a root switch are now no longer contiguous and not part of the same broadcast domain. Spanning Tree is a standard that is specified under ANSI/IEEE Std 802.1D, the entirety of which is incorporated herein by this reference.

If the teaming driver detects one or more isolated NICs at 702 (due to a condition such as the one illustrated in FIG. 6B), the teaming driver identifies all of the segments that have become isolated from the paths to which the Primary NIC is coupled, and configures one of the NICs coupled to each of the isolated segment to operate as a primary NIC at 704. An isolated segment will consist of a contiguous subset of one or more of the set of paths that constitute the original segment. In the example of FIG. 6B, there is only one isolated segment that consists of one secondary path (i.e. link L2, Switch A 802 and uplink 806) that is no longer contiguous with the other paths. Thus, teaming driver 310 will reconfigure the one secondary NIC N2 372 that is coupled to the isolated segment to operate as a primary resource for the isolated segment. This configuration process has been previously described in detail in the context of the teaming mechanism. If more than one NIC is coupled to the isolated segment (either through the same or a different but contiguous path), only one of the NICs is configured to operate as a primary resource for the isolated segment.

The teaming driver than operates in "split segment mode" beginning at 704. In an embodiment, the teaming driver assigns the team MAC address to the newly reconfigured primary NIC (in the example of FIGS. 6A-C, this is MAC address=A). In normal mode, only one network device or team of devices is permitted to have the same MAC address on a layer 2 network segment (i.e. in the same broadcast domain). In the split segment mode this is not a problem because NIC N2 (372, FIGS. 6A-C) is now isolated from the rest of the team coupled to the segment to which primary NIC N1 370 is coupled. Thus, in the procedural flow of FIG. 7, if the teaming driver 310 assigns the team MAC address to each new primary, the answer at 706 is "Yes" and processing continues at 710.

In another embodiment, the teaming driver 310 can assign each newly reconfigured primary NIC on each isolated segment a different MAC address. Thus, in FIG. 6C, NIC N2 372 can be assigned a MAC address=B. In this case, however, the clients/devices that were communicating with the server using the team MAC address (MAC address=A) must now be advised to use the MAC address B that has been assigned to that particular segment. Thus, in the procedural flow of FIG. 7, if the teaming driver 310 assigns a different MAC address to each new primary, the answer at 706 is "No" and processing continues at 708 where an ARP reply is broadcast on each of the isolated segments. The ARP reply forces the clients/devices on each segment to update their ARP tables to reflect the new MAC address assigned to that segment as the address by which they may communicate with the computer system 100.

Once the segment is split, there is no way for the protocol stack to know which clients are on which segments. The teaming driver must track the locations of all network devices to ascertain on which of the isolated segments the devices reside. Thus in an embodiment at 710, the teaming driver 310 must initially broadcast all ARP requests over all of the isolated segments to which the team is coupled until it receives ARP replies at one of the primaries that serves to indicate to which segment a particular network device is coupled. The teaming driver 310 establishes and maintains temporary ARP tables at 712 for each isolated segment and once a reply is received at one of the primary NICs, the ARP table established for that segment is updated with the MAC address of the replying client/network device. Henceforth the teaming driver 310 knows that packets destined for that network device should be transmitted through that NIC to that isolated segment.

Processing continues at 714 where the teaming driver 310 then monitors for the return of continuity between the isolated segments. For example, the teaming driver 310 continues to send heartbeat packets between the team members until they are again received, indicating that connectivity in the uplink has been restored. If Spanning Tree is used, the teaming driver 310 monitors Spanning Tree data until it detects that there is once again only one root switch to which the entire team is coupled. This again would indicate that continuity among the set of paths comprising the original segment has been restored. Once continuity of the original segment is detected at 716, the answer is "Yes" and processing continues at 718 where the primaries are returned to their original roles in the normal mode (i.e. only one primary member remains, such as in FIG. 6A).

Processing continues at 720 where it is determined whether the NICs that had been reconfigured during split segment mode as primary resources were assigned the team MAC address or their own unique MAC address as primary resources. If unique MAC addresses were assigned, the answer at 720 is "Yes" and processing continues at 722 where the teaming driver 310 issues a broadcast ARP reply that forces all devices on the segment back to the original team MAC address=A. Processing then continues at 700, where the teaming driver 310 then monitors for split segments again in accordance with the foregoing discussion. If the answer at 720 is "No", processing again resumes at 700. In an embodiment where the tam MAC address=A is assigned to all primaries created during the split segment recovery mode, there will be a brief time after continuity of the segment is restored where more than one primary will be operating with the same MAC address within the same broadcast domain. While this can cause confusion briefly for the switches responding to multiple devices with the same MAC address, once the team has been restored to having a single primary, the system will recover and operate normally with no harm done.

Figure 8A:
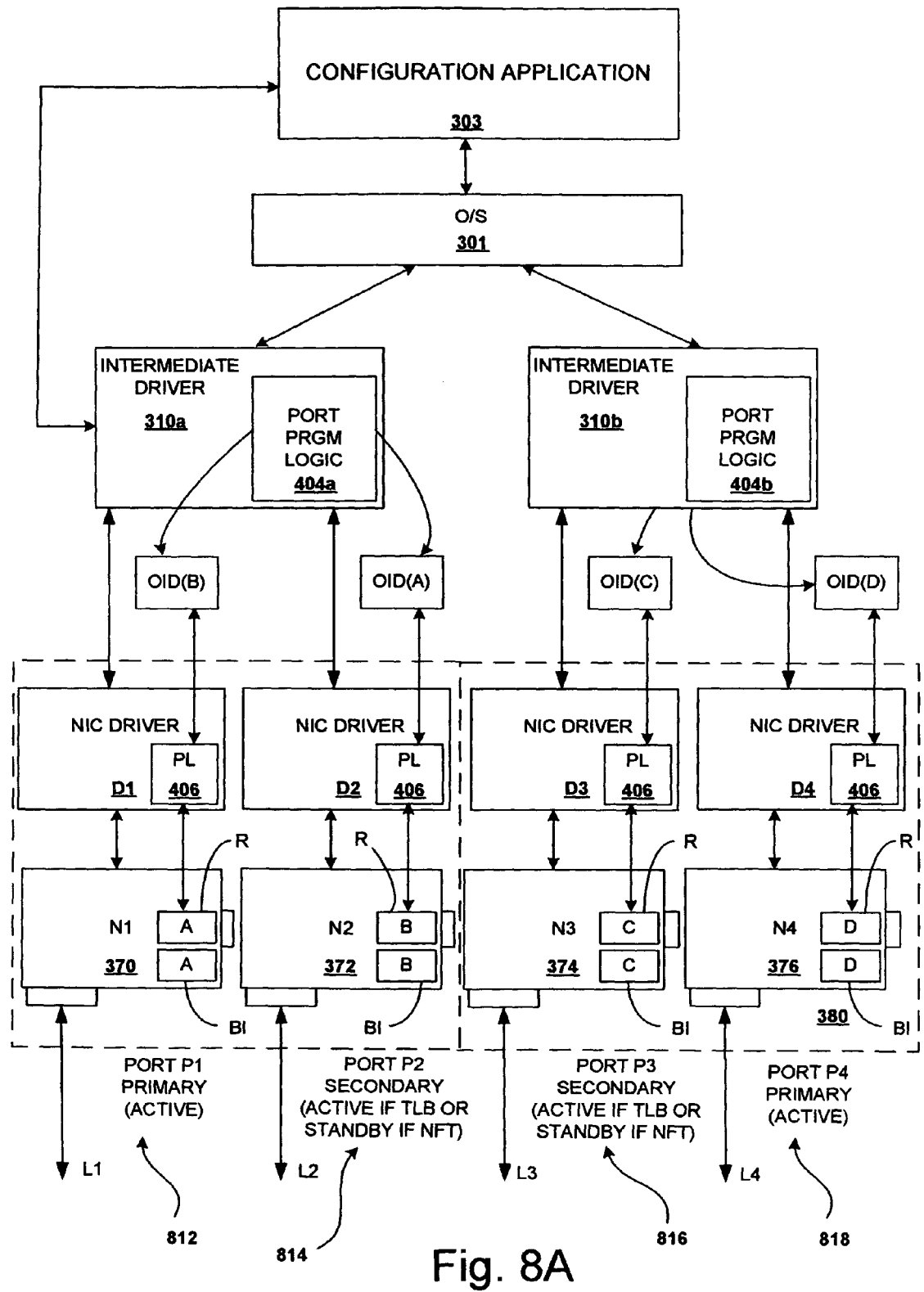
FIG. 8A is a block diagram illustrating network resources of the computer system of FIGS. 6A and 6B configured as a NFT or TLB team and configured to operate in a normal mode in accordance with an embodiment of the invention.
Figure 8B:
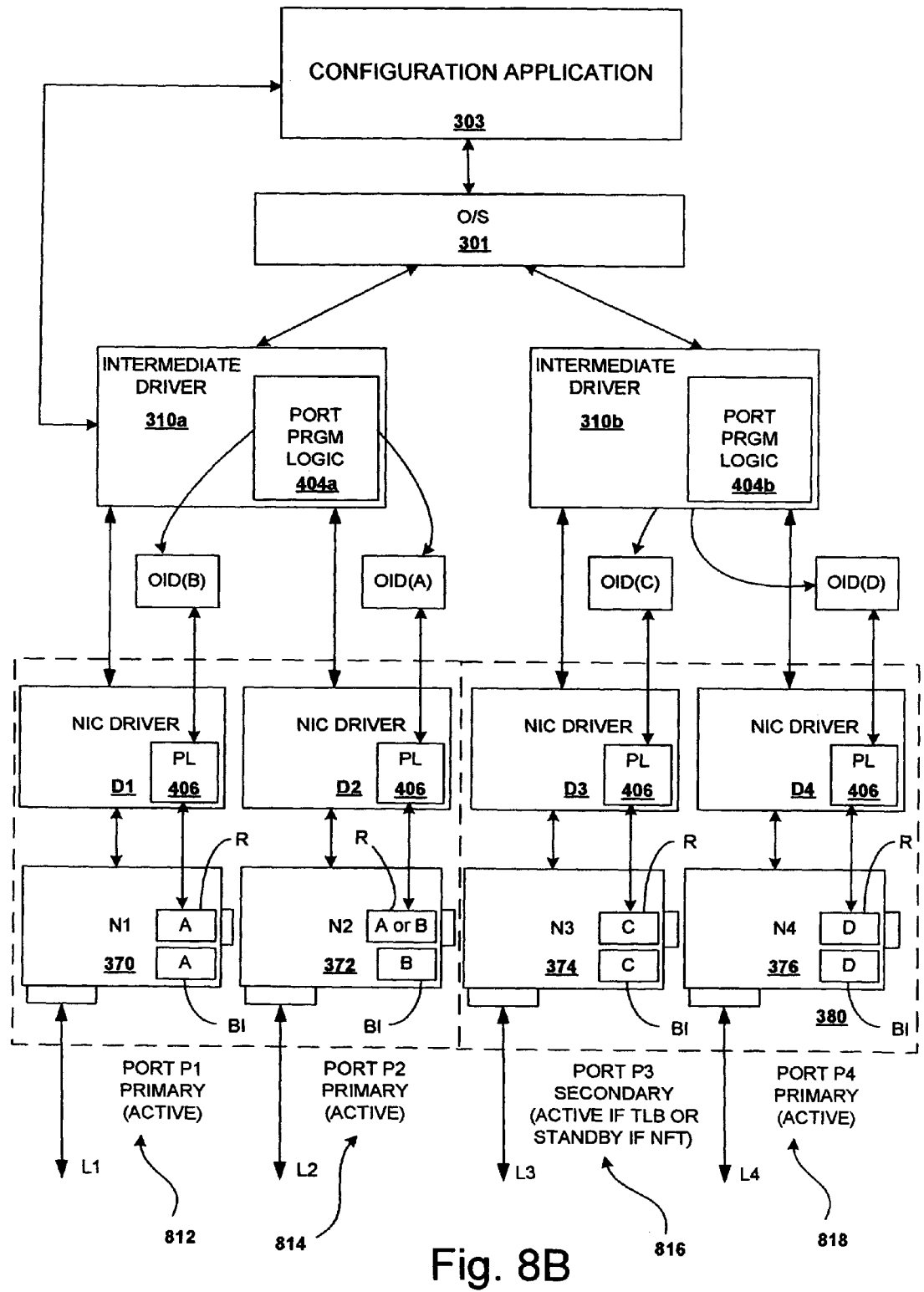
FIG. 8B is a block diagram illustrating network resources of the computer system of FIG. 6C configured to operate in a split segment recovery mode in accordance with an embodiment of the invention.

FIG. 8A illustrates an embodiment of the system 100 for the example of FIGS. 6A-B. In this example, the team that corresponds to the team of FIGS. 6A-B is controlled by the instantiation of the teaming driver 310a. Another team of NICs (NICs N3 374 and N4 376) are teamed and controlled by the instantiation of the teaming driver 310b. The second team is not shown in FIGS. 6A-B for simplicity because it is not coupled to the segment of interest. FIG. 8B demonstrates the system 100 configured by the teaming driver for split segment mode as previously illustrated in FIG. 6C, where NIC N2 372 has now been configured to operate as a primary and assigned either the team MAC address=A or a unique MAC address=B.

Figure 9A:
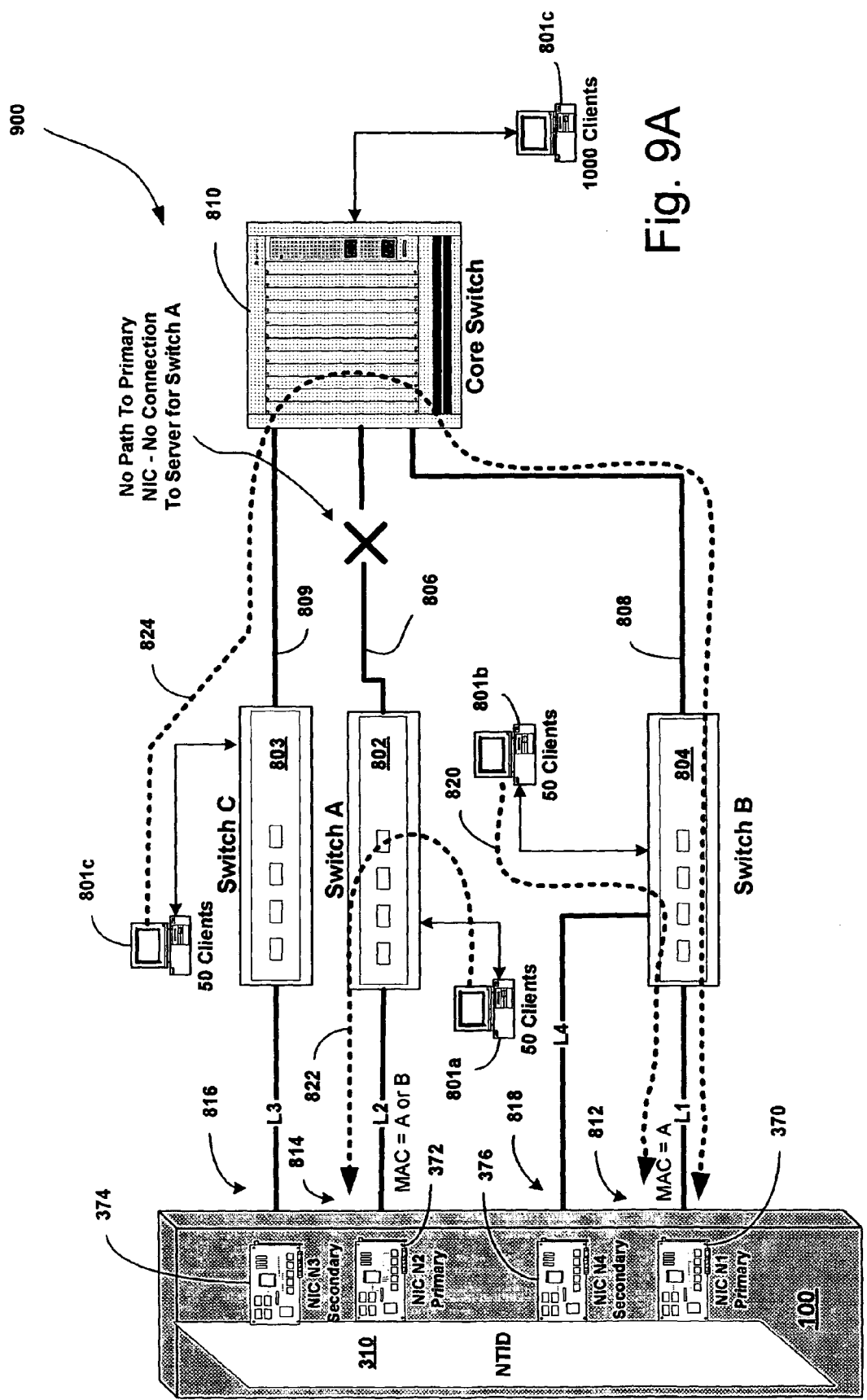
FIG. 9A is a network diagram illustrating a more complex layer2 network segment having an uplink failure to which a computer system is coupled that features an embodiment of the invention.
Figure 9B:
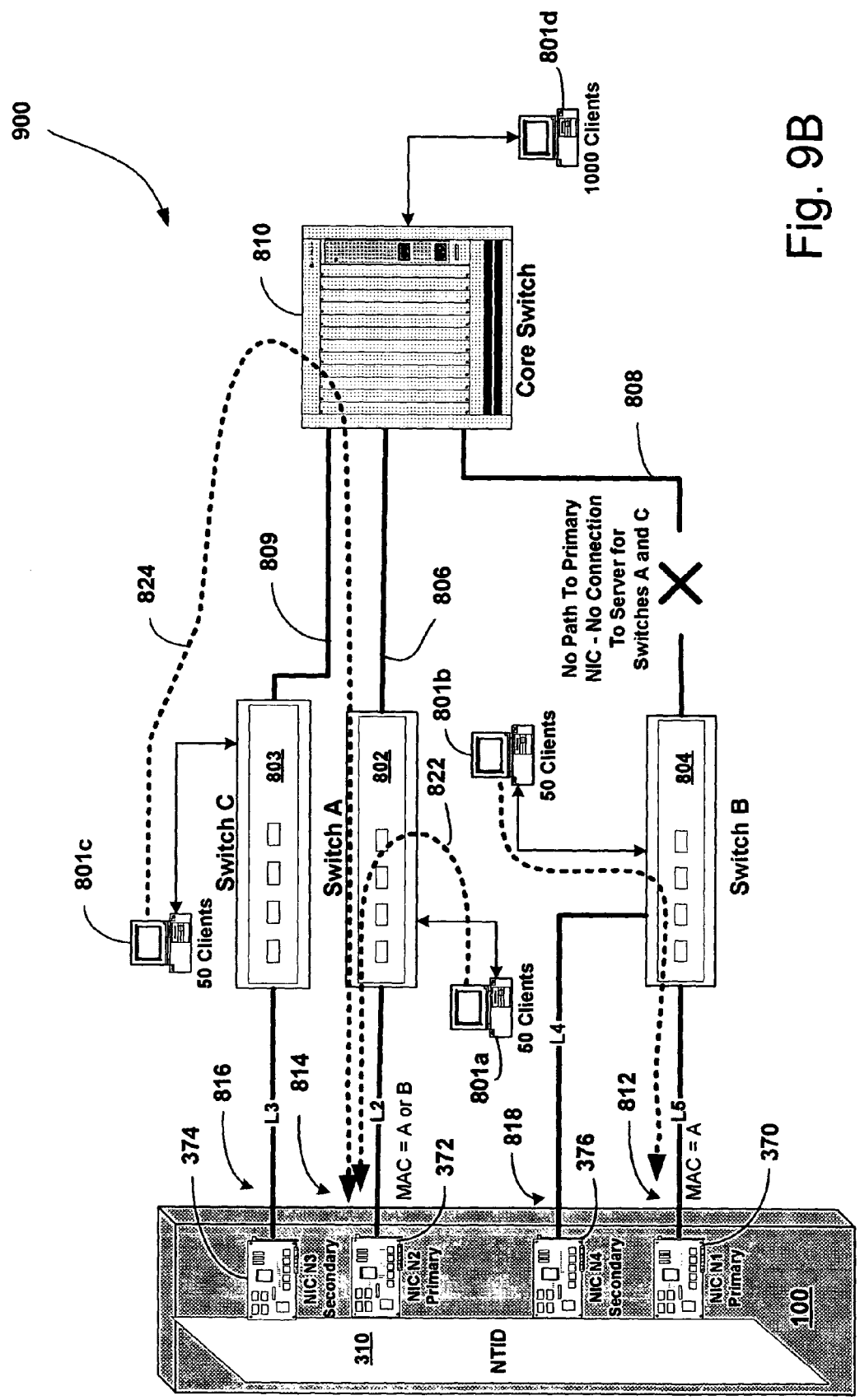
FIG. 9B is a network diagram illustrating a more complex layer2 network segment having an uplink failure to which a computer system is coupled that features an embodiment of the invention.

FIGS. 9A-B illustrate more complex application examples of an embodiment of the invention. In FIG. 9A the team includes all four NICs N1-N4. In this case, the loss of uplink is in uplink 806. Once again, NIC N2 372 and the path to which it is coupled becomes isolated from the rest of the paths of the segment. In this case, connectivity remains for secondary NICs N3 374 through path 824 and N4 376 provides a redundant link L4 to Switch B 804. When teaming driver 310 detects that NIC N2 372 and the path to which it is coupled has become isolated, it goes into split segment mode as previously described and NIC N2 372 is reconfigured to operate as a primary resource to provide a connection to the server 100 for the isolated path 822.

Figure 10A:
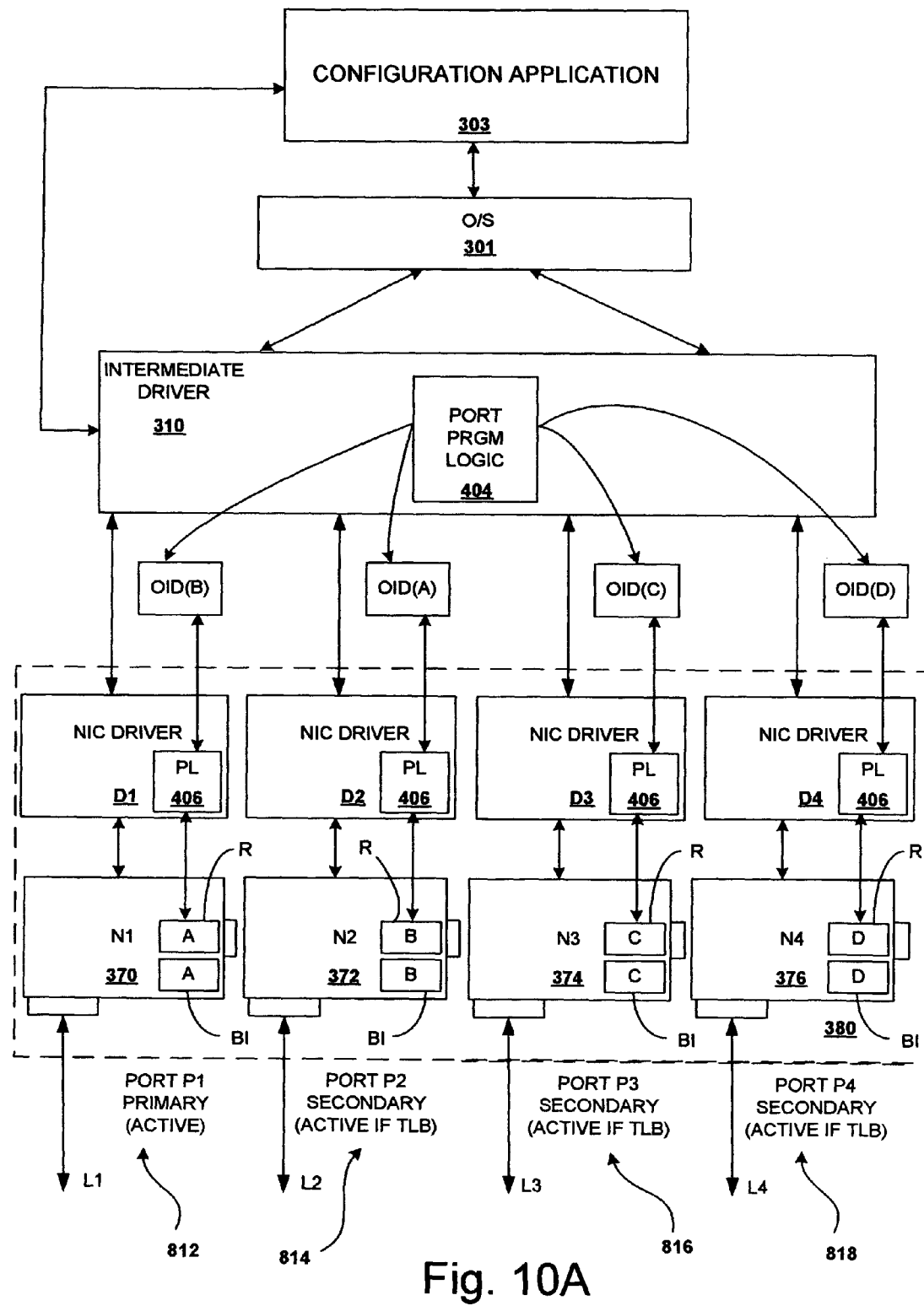
FIG. 10A is a block diagram illustrating network resources of the computer system of FIGS. 9A and 9B configured to operate in a normal mode in accordance with an embodiment of the invention.
Figure 10B:
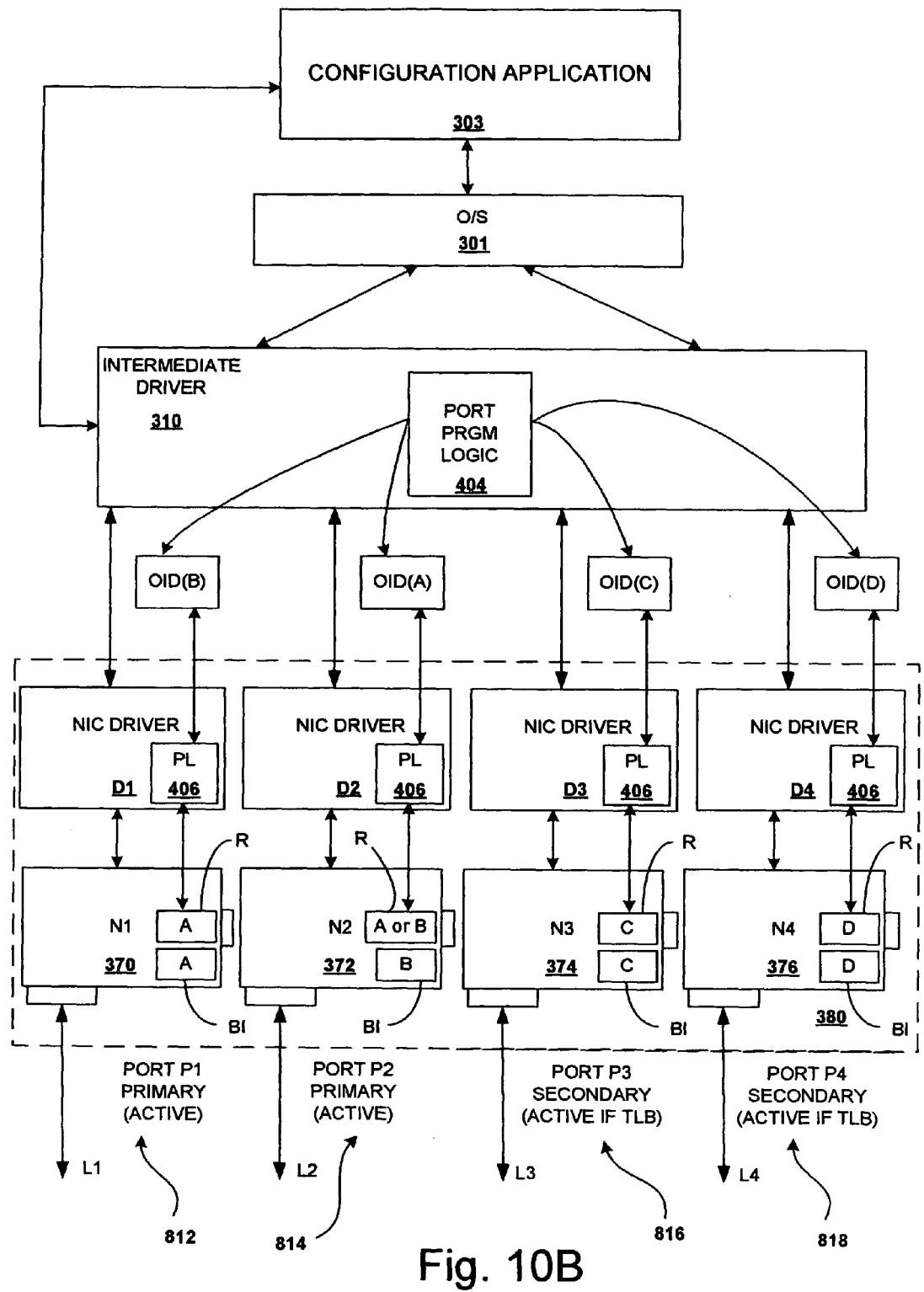
FIG. 10B is a block diagram illustrating network resources of the computer system of FIGS. 9A and 9B configured to operate in a split segment recovery mode in accordance with an embodiment of the invention.

FIG. 9B illustrates an example where the uplink 808 is lost and all of the other secondary paths become isolated. In this case, the isolated segment includes two contiguous secondary paths (i.e. Link L2, Switch A 802 and uplink 806; Link L3, Switch C 803 and uplink 809). Only one of the two secondary NICs NIC N2 372 or NIC N3 374 is permitted to be reconfigured as the primary resource for the isolated segment, but only one of them is so configured. In the illustrated example, NIC N2 372 is reconfigured to operate as the primary for the isolated segment, and paths 822 and 824 are provided for the isolated segment through NIC N2 372. Moreover, connectivity to the server 100 for the clients 801d coupled to the core switch 810 is also provided through NIC N2 372. FIGS. 10A-B each illustrate an embodiment of the server 100 for the failure examples of FIGS. 9A-B. FIG. 10A illustrates the team of FIGS. 9A-B operating in the normal mode. FIG. 10B illustrates the team reconfigured to operate in the split segment mode for both examples of FIGS. 9A and 9B.

What is claimed is:

1. A method of automatically recovering from a split segment condition in which a contiguous layer 2 network segment comprising a set of contiguous paths, each of the set of paths directly coupling one or more members of a team of network resources of a computer system to a common switch, is split into two or more noncontiguous segments each comprising a contiguous subset of one or more of the set of paths, said method comprising:

operating in normal mode wherein the team has only one member configured to operate as a primary resource and the rest of the team members are secondary resources, said operating in normal mode further comprising monitoring for a split segment condition wherein the network segment has been split into two or more noncontiguous segments; and operating in split segment mode upon detection of the split segment condition such that each of the noncontiguous segments is coupled to one team member configured to be operable as a primary resource.

2. The method of claim 1 wherein said monitoring for a split segment condition further comprises:

transmitting test packets between each of the members of the team to determine which of the set of paths are no longer contiguous with one another in accordance with which team members do not receive the test packets from which other of the team members; and identifying as one of the noncontiguous segments each of those subsets of one or more paths that are contiguous with one another but that are no longer contiguous with others of the set of paths and to which are directly coupled at least one of the team members having physical link with the network.

3. The method of claim 1 wherein said detection of the split segment condition further comprises:
   receiving Spanning Tree data on the layer 2 network defining a root switch for network segments; and
   identifying as one of the noncontiguous segments any subset of one or more contiguous paths of the set of paths that includes a switch that becomes identified by the Spanning Tree data as a root switch.

4. The method of claim 1 wherein said operating in split segment mode further comprises for each noncontiguous segment having its subset of paths no longer contiguous with a path coupled to the one primary resource, reconfiguring one of the team members coupled to the noncontiguous segment configured to operate as secondary resource to operate as a primary resource.

5. The method of claim 4 wherein said reconfiguring one of the secondary resources further comprises assigning a team MAC address to the secondary resource being reconfigured to operate as a primary resource.

6. The method of claim 5 wherein said operating in split segment mode further comprises tracking which of the network devices is coupled to which of the noncontiguous segments.

7. The method of claim 6 wherein the layer 2 network is an Ethernet network and said tracking further comprises broadcasting an ARP request for each of the network devices over all of the noncontiguous segments and noting the segment on which a response to the ARP request from a particular network device is received as the segment over which to communicate with that network device.

8. The method of claim 7 wherein said noting the segment further comprises maintaining a separate address table for each of the noncontiguous segments in which to store the received responses for each of the noncontiguous segments.

9. The method of claim 4 wherein said reconfiguring one of the secondary resources further comprises assigning a MAC address different than a team MAC address to each secondary resource being reconfigured to operate as a primary resource.

10. The method of claim 9 further comprising recognizing when the two or more of the noncontiguous segments become a single contiguous segment again and reconfiguring all but one of the primary members coupled to the contiguous segment to operate as secondary resources.

11. The method of claim 10 wherein said reconfiguring further comprises reassigning the team MAC address to the resources reconfigured from primary resources back to secondary resources and broadcasting an ARP reply over the entire network segment to force an update to MAC tables of all of the network devices coupled to the network segment so that they know to communicate with the team using the team MAC address.

12. The method of claim 1 further comprising recognizing when the two or more of the noncontiguous segments become a single contiguous segment again and reconfiguring all but one of the primary resources coupled to the contiguous segment to operate as secondary resources.

13. A computer system that automatically recovers from a split segment condition in which a contiguous layer 2 network segment, comprising a set of contiguous paths each directly coupling one or more members of a team of network resources of the computer system to a common switch of a layer 2 network, is split into two or more noncontiguous segments each comprising a contiguous subset of one or more of the set of paths, said computer system comprising:
   a team of network resources each having a driver, one or more of the resources coupling said computer system to each one of the set of paths; and
   a teaming driver that binds the drivers of each member of the team and that controls communication with the segments through the resources of the team, the teaming driver for detecting whenever the network segment has been split into two or more noncontiguous segments and for reconfiguring the team such that one of the members coupled to a path within each of the noncontiguous segments is operable as a primary resource.

14. The computer system of claim 13 wherein the teaming driver causes test packets to be transmitted between each of the members of the team to determine which of the paths are no longer contiguous with one another and identifies as one of the noncontiguous segments each of those subsets of one or more of the set of paths that are contiguous with one another but that are no longer contiguous with others of the set of paths and to which are directly coupled at least one of the team members having physical link with the network.

15. The computer system of claim 13 wherein the teaming driver monitors Spanning Tree data on the layer 2 network defining a root switch for network segments and identifies as one of the noncontiguous segments any subset of one or more contiguous paths of the set of paths that includes a switch that becomes identified by the Spanning Tree data as a root switch.

16. The computer system of claim 13 wherein the teaming driver, for each noncontiguous segment having its subset of paths no longer contiguous with a path coupled to the one primary resource, configures one of the secondary resources coupled to the noncontiguous segment to operate as a primary resource.

17. The computer system of claim 16 wherein the teaming driver assigns a team MAC address to the secondary member being configured to operate as a primary resource.

18. The computer system of claim 16 wherein the teaming driver assigns a MAC address different than a team MAC address to each secondary resource being configured to operate as a primary resource.

19. The computer system of claim 18 wherein the teaming driver recognizes when the two or more of the noncontiguous segments become a single contiguous segment again and reconfigures all but one of the primary resources coupled to the contiguous segment to operate as secondary resources.

20. The computer system of claim 19 wherein the teaming reassigns the team MAC address to the resources reconfigured from primary back to secondary and broadcasts an ARP reply over the entire network segment to force an update to MAC tables of all of the network devices coupled to the network segment so that they know to communicate with the team using the team MAC address.

21. The computer system of claim 16 wherein the teaming driver tracks which of the network devices is coupled to which of the noncontiguous segments.

22. The computer system of claim 19 wherein the layer 2 network is an Ethernet network and the teaming driver initiates broadcasts of an ARP request for each of the network devices over all of the noncontiguous segments and notes the segment on which a response to the ARP request from a particular network device is received as the segment over which to communicate with that network device.

23. The computer system of claim 22 wherein the teaming driver maintains a separate address table for each of the noncontiguous segments in which to store the received responses for each of the noncontiguous segments.

24. The computer system of claim 13 further wherein the teaming driver recognizes when the two or more of the noncontiguous segments become a single contiguous segment again and reconfigures all but one of the primary resources coupled to the contiguous segment to operate as secondary resources.

25. An apparatus for automatically recovering from a split segment condition in which a contiguous layer 2 network segment, comprising a set of contiguous paths each directly coupling one or more members of a team of network resources of a computer system to a common switch of a layer 2 network, is split into two or more noncontiguous segments each comprising a contiguous set of one or more of the set of paths, said apparatus comprising:
    means for operating in normal mode wherein the team has only one member configured to operate as a primary resource and the rest of the team members are secondary resources;
    means for monitoring for a split segment condition wherein the network segment has been split into two or more noncontiguous segments; and
    means for operating in split segment mode upon detection of the split segment condition such that each of the noncontiguous segments is coupled to one team member configured to be operable as a primary resource.

26. The apparatus of claim 25 wherein monitoring for a split segment condition comprises:
    transmitting test packets between each of the members of the team to determine which of the set of paths are no longer contiguous with one another in accordance with which team members do not receive the test packets from which other of the team members; and
    identifying as one of the noncontiguous segments each of those subsets of one or more paths that are contiguous with one another but that are no longer contiguous with others of the set of paths and to which are directly coupled at least one of the team members having physical link with the network.

27. The apparatus of claim 25 wherein said detection of the split segment condition further comprises:
    receiving Spanning Tree data on the layer 2 network defining a root switch for network segments; and
    identifying as one of the noncontiguous segments any subset of one or more contiguous paths of the set of paths that includes a switch that becomes identified by the Spanning Tree data as a root switch.

28. The apparatus of claim 25 wherein operating in split segment mode comprises, for each noncontiguous segment having its subset of paths no longer contiguous with a path coupled to the one primary resource, reconfiguring one of the team members coupled to the noncontiguous segment configured to operate as secondary resource to operate as a primary resource.

29. The apparatus of claim 28 wherein reconfiguring one of the team members comprises assigning a team MAC address to the secondary resource being reconfigured to operate as a primary resource.

30. The apparatus of claim 29 wherein operating in split segment mode further comprises-tracking which of the network devices is coupled to which of the noncontiguous segments.

31. The apparatus of claim 30 wherein the layer 2 network is an Ethernet network and tracking which of the network devices is coupled to which of the noncontiguous segments comprises broadcasting an ARP request for each of the network devices over all of the noncontiguous segments and noting the segment on which a response to the ARP request from a particular network device is received as the segment over which to communicate with that network device.

32. The apparatus of claim 31 wherein noting the segment further comprises maintaining a separate address table for each of the noncontiguous segments in which to store the received responses for each of the noncontiguous segments.

33. The apparatus of claim 28 wherein reconfiguring one of the team members comprises assigning a MAC address different than a team MAC address to each secondary resource being reconfigured to operate as a primary resource.

34. The apparatus of claim 33 further comprising means for recognizing when the two or more of the noncontiguous segments become a single contiguous segment again and means for reconfiguring all but one of the primary members coupled to the contiguous segment to operate as secondary resources.

35. The apparatus of claim 34 wherein reconfiguring all but one of the primary members coupled to the contiguous segment to operate as secondary resources comprises reassigning the team MAC address to the resources reconfigured from primary resources back to secondary resources and broadcasting an ARP reply over the entire network segment to force an update to MAC tables of all of the network devices coupled to the network segment so that they know to communicate with the team using the team MAC address.

36. The apparatus of claim 25 further comprising means for recognizing when the two or more of the noncontiguous segments become a single contiguous segment again and means for reconfiguring all but one of the primary resources coupled to the contiguous segment to operate as secondary resources.

37. A method of automatically recovering from a split segment condition in which a contiguous layer 2 network segment comprising a set of contiguous paths, each of the set of paths directly coupling one or more members of a team of network resources of a computer system to a common switch, is split into two or more noncontiguous segments each comprising a contiguous subset of one or more of the set of paths, said method comprising:
    operating in normal mode wherein the team has only one member configured to operate as a primary resource and the rest of the team members are secondary resources, said operating in normal mode further comprising monitoring for a split segment condition wherein the network segment has been split into two or more noncontiguous segments;
    operating in split segment mode upon detection of the split segment condition such that each of the noncontiguous segments is coupled to one team member configured to be operable as a primary resource, said operating in split segment mode further comprising:
        for each noncontiguous segment having its subset of paths no longer contiguous with a path coupled to the one primary resource, reconfiguring one of the team members coupled to the noncontiguous segment configured to operate as secondary resource to operate as a primary resource.

38. A method of automatically recovering from a split segment condition in which a contiguous layer 2 network segment comprising a set of contiguous paths, each of the set of paths directly coupling one or more members of a team of network resources of a computer system to a common switch, is split into two or more noncontiguous segments each comprising a contiguous subset of one or more of the set of paths, said method comprising:
    operating in normal mode wherein the team has only one member configured to operate as a primary resource and the rest of the team members are secondary resources, said operating in normal mode further comprising monitoring for a split segment condition wherein the network segment has been split into two or more noncontiguous segments; and operating in split segment mode upon detection of the split segment condition such that each of the noncontiguous segments is coupled to one team member configured to be operable as a primary resource, said operating in split segment mode further comprising:

broadcasting an ARP request for each of the network devices over all of the noncontiguous segments; and noting the segment on which a response to the ARP request from a particular network device is received as the segment over which to communicate with that network device.

39. The method of claim 38 wherein said noting the segment further comprises maintaining a separate address table for each of the noncontiguous segments in which to store the received responses for each of the noncontiguous segments.

40. The method of claim 39 further comprising recognizing when the two or more of the noncontiguous segments become a single contiguous segment again and reconfiguring all but one of the primary members coupled to the contiguous segment to operate as secondary resources.

41. The method of claim 40 wherein said reconfiguring further comprises reassigning a team MAC address to the resources reconfigured from primary resources back to secondary resources and broadcasting an ARP reply over the entire network segment to force an update to MAC tables of all of the network devices coupled to the network segment so that they know to communicate with the team using the team MAC address.

42. An apparatus for automatically recovering from a split segment condition in which a contiguous layer 2 network segment comprising a set of contiguous paths, each of the set of paths directly coupling one or more members of a team of network resources of a computer system to a common switch, is split into two or more noncontiguous segments each comprising a contiguous subset of one or more of the set of paths, said apparatus comprising:

means for operating in normal mode wherein the team has only one member configured to operate as a primary resource and the rest of the team members are secondary resources;

means for monitoring for a split segment condition wherein the network segment has been split into two or more noncontiguous segments;

means for operating in split segment mode upon detection of the split segment condition such that each of the noncontiguous segments is coupled to one team member configured to be operable as a primary resource, wherein operating in split segment mode comprises:

for each noncontiguous segment having its subset of paths no longer contiguous with a path coupled to the one primary resource, reconfiguring one of the team members coupled to the noncontiguous segment configured to operate as secondary resource to operate as a primary resource.

43. An apparatus for automatically recovering from a split segment condition in which a contiguous layer 2 network segment comprising a set of contiguous paths, each of the set of paths directly coupling one or more members of a team of network resources of a computer system to a common switch, is split into two or more noncontiguous segments each comprising a contiguous subset of one or more of the set of paths, said apparatus comprising:

means for operating in normal mode wherein the team has only one member configured to operate as a primary resource and the rest of the team members are secondary resources;

means for monitoring for a split segment condition wherein the network segment has been split into two or more noncontiguous segments; and means for operating in split segment mode upon detection of the split segment condition such that each of the noncontiguous segments is coupled to one team member configured to be operable as a primary resource, wherein operating in split segment mode comprises:

broadcasting an ARP request for each of the network devices over all of the noncontiguous segments; and noting the segment on which a response to the ARP request from a particular network device is received as the segment over which to communicate with that network device.

44. The apparatus of claim 43 wherein noting the segment further comprises maintaining a separate address table for each of the noncontiguous segments in which to store the received responses for each of the noncontiguous segments.

45. The apparatus of claim 44 further comprising means for recognizing when the two or more of the noncontiguous segments become a single contiguous segment again and means for reconfiguring all but one of the primary members coupled to the contiguous segment to operate as secondary resources.

46. The apparatus of claim 45 wherein reconfiguring all but one of the primary members coupled to the contiguous segment to operate as secondary resources comprises reassigning a team MAC address to the resources reconfigured from primary resources back to secondary resources and broadcasting an ARP reply over the entire network segment to force an update to MAC tables of all of the network devices coupled to the network segment so that they know to communicate with the team using the team MAC address.

* * * * *

UNITED STATES PATENT AND TRADEMARK OFFICE
CERTIFICATE OF CORRECTION

| | | |
|---|---|---|
| PATENT NO. | : 7,990,849 B2 | Page 1 of 1 |
| APPLICATION NO. | : 11/048523 | |
| DATED | : August 2, 2011 | |
| INVENTOR(S) | : Michael Sean McGee et al. | |

It is certified that error appears in the above-identified patent and that said Letters Patent is hereby corrected as shown below:

In column 20, line 54, in Claim 22, delete "claim 19" and insert -- claim 21 --, therefor.

Signed and Sealed this
Nineteenth Day of June, 2012

David J. Kappos
*Director of the United States Patent and Trademark Office*